United States Patent
Xia et al.

(10) Patent No.: US 9,628,380 B2
(45) Date of Patent: Apr. 18, 2017

(54) METHOD AND SYSTEM FOR ROUTING A NETWORK FUNCTION CHAIN

(71) Applicant: Telefonaktiebolaget L M Ericsson (publ), Stockholm (SE)

(72) Inventors: Ming Xia, San Jose, CA (US); Meral Shirazipour, San Jose, CA (US)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 217 days.

(21) Appl. No.: 14/641,240

(22) Filed: Mar. 6, 2015

(65) Prior Publication Data
US 2016/0261495 A1    Sep. 8, 2016

(51) Int. Cl.
H04L 12/775 (2013.01)
H04L 12/721 (2013.01)
H04L 12/725 (2013.01)

(52) U.S. Cl.
CPC ............ *H04L 45/58* (2013.01); *H04L 45/12* (2013.01); *H04L 45/306* (2013.01); *H04L 45/44* (2013.01)

(58) Field of Classification Search
CPC ...................................... H04L 45/58
See application file for complete search history.

(56) References Cited

U.S. PATENT DOCUMENTS

| | | | |
|---|---|---|---|
| 5,533,106 A * | 7/1996 | Blumhardt | H04M 1/57 379/130 |
| 6,477,582 B1 | 11/2002 | Luo et al. | |
| 7,885,269 B2 * | 2/2011 | Bayati | G06F 17/509 370/389 |
| 8,817,625 B1 | 8/2014 | Zhang et al. | |
| 2005/0041676 A1 * | 2/2005 | Weinstein | H04L 45/02 370/401 |
| 2009/0296710 A1 * | 12/2009 | Agrawal | H04L 45/04 370/392 |
| 2013/0163467 A1 * | 6/2013 | Tesov | H04L 45/12 370/254 |

(Continued)

OTHER PUBLICATIONS

"Charter for Working Group," Service Function Chaining (sfc), <https://datatracker.ietf.org/wg/sfc/charter/>, retrieved Feb. 9, 2015, 3 pages.

(Continued)

*Primary Examiner* — Brian D Nguyen
*Assistant Examiner* — Toan Nguyen
(74) *Attorney, Agent, or Firm* — Nicholson De Vos Webster & Elliott LLP

(57) ABSTRACT

In one embodiment, a request is received to route a network function chain. For each contained network function, a subgraph is generated, where each of a plurality of network elements in a network is split into two vertexes, and one edge is added between the split two vertexes for each network element that hosts that network function of the subgraph. The subgraphs are ordered and connected through connecting each vertex with one edge to another vertex with one edge in a subsequent subgraph to form a graph, where the connection is included in a representation of the network. Each edge includes a cost measure. The method selects a path from the vertex representing the source network element to the vertex representing the destination network element in the graph to route the network function chain, where each edge of the path is selected based on at least its cost measure.

20 Claims, 10 Drawing Sheets

(56) References Cited

U.S. PATENT DOCUMENTS

| | | |
|---|---|---|
| 2013/0272305 A1 | 10/2013 | Lefebvre et al. |
| 2014/0215074 A1 | 7/2014 | Zhang et al. |
| 2014/0355436 A1 | 12/2014 | Zhang et al. |

OTHER PUBLICATIONS

"Network Functions Virtualisation (NFV); Architectural Framework," ETSI GS NFV 002 V1.1.1, (Oct. 2013), pp. 1-21.
"Network Functions Virtualisation (NFV); Use Cases," ETSI GS NFV 001, V1.1.1, (Oct. 2013), pp. 1-50.
B. Claise et al., "Specification of the IP Flow Information Export (IPFIX) Protocol for the Exchange of Flow Information," Internet Engineering Task Force (IETF), Request for Comments: 7011, Sep. 2013, pp. 1-76, IETF Trust and the persons identified as the document authors.
J. Halpern et al., "Service Function Chaining (SFC) Architecture draft-ietf-sfc-architecture-04," Network Working Group, Internet-Draft, Jan. 12, 2015, pp. 1-27, IETF Trust and the persons identified as the document authors.
J. Halpern et al., "Service Function Chaining (SFC) Architecture draft-ietf-sfc-architecture-05," Network Working Group, Internet-Draft, Feb. 17, 2015, pp. 127, IETF Trust and the persons identified as the document authors.
M. Xia et al., "Network Function Placement Method for NFV Chaining in Optical/Packet Hybrid Data Centers,"U.S. Appl. No. 61/978,448, filed Apr. 11, 2014, pp. 1-5.
M. Xia et al., "A Method and System for Network Function Placement," U.S. Appl. No. 14/328,471, filed Jul. 10, 2014, pp. 1-41.
J. Yen, "An algorithm for finding shortest routes from all source nodes to a given destination in general networks," Quarterly of Applied Mathematics 27, pp. 526-530. 1970, <http://en.wikipedia.orq/wiki/Yen%27s_algorithm>, retrieved Feb. 9, 2015, 6 pages.
Y. Zhang et al., "StEERING: A Software-Defined Networking for Inline Service Chaining," Oct. 2013, IEEE International Conference on Network Protocols (ICNP), 10 pages.
J. Yen, "Finding the κ Shortest Loopless Paths in a Network," Jul. 1971, Management Science, vol. 17, No. 11, 5 pages.
"Network Function Virtualisation; Use Cases;; GS-NFV-009v012-clean_irc-DEAC", European Telecommunications Standards Institute (ETSI), 650, vol. ISG, No. V012, Sep. 4, 2013, pp. 1-54.
J. Postel, "User Datagram Protocol," 28 Aug. 1980, 3 pages, RFC: 768.
"Transmission Control Protocol, DARPA Internet Program Protocol Specification," Sep. 1981, 91 pages, RFC: 793, Information Sciences Institute, University of Southern California, Marina del Rey, California.
C. Hedrick, "Routing Information Protocol," Jun. 1988, 33 pages, Network Working Group, Request for Comments: 1058.
David Oran, "OSI IS-IS Intra-domain Routing Protocol," Feb. 1990, 157 pages, Network Working Group, Request for Comments: 1142.
T. Socolofsky, et al., "A TCP/IP Tutorial," Jan. 1991, 28 pages, Network Working Group, Request for Comments: 1180.
G. Malkin, et al., "RIPng for IPv6," Jan. 1997, 19 pages, Network Working Group, Request for Comments: 2080.
R. Braden, et al., "Resource ReSerVation Protocol (RSVP)—Version 1 Functional Specification," Sep. 1997, 112 pages, Network Working Group, Request for Comments: 2205.
J. Wroclawski, "The Use of RSVP with IETF Integrated Services," Sep. 1997, 33 pages, Network Working Group, Request for Comments: 2210.
J. Wroclawski, "Specification of the Controlled-Load Network Element Service," Sep. 1997, 19 pages, Network Working Group, Request for Comments: 2211.
S. Shenker, et al., "Specification of Guaranteed Quality of Service," Sep. 1997, 20 pages, Network Working Group, Request for Comments: 2212.
J. Moy, "OSPF Version 2," Apr. 1998, 244 pages, Network Working Group, Request for Comments: 2328, The Internet Society.
G. Malkin, "RIP Version 2," Nov. 1998, 39 pages, Network Working Group, Request for Comments: 2453, The Internet Society.
S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.
J. Heinanen, et al., "Assured Forwarding PHB Group," Jun. 1999, 11 pages, Network Working Group, Request for Comments: 2597, The Internet Society.
D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
D. Awduche, et al., "RSVP-TE: Extensions to RSVP for LSP Tunnels," Dec. 2001, 61 pages, Network Working Group, Request for Comments: 3209, The Internet Society.
B. Davie, et al., "An Expedited Forwarding PHB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffsery Routers," May 2002, 56 pages, Network Working Group, Request for Comments: 3290, The Internet Society.
K. Chan, et al., "Differentiated Services Quality of Service Policy Information Base," Mar. 2003, 96 pages, Network Working Group, Request for Comments: 3317, The Internet Society.
L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.
K. Kompella, et al., "Procedures for Modifying the Resource reSerVation Protocol (RSVP)," Oct. 2004, 7 pages, Network Working Group, Request for Comments: 3936, The Internet Society.
B. Fenner, et al., "Management Information Base for the User Datagram Protocol (UDP)," Jun. 2005, 19 pages, Network Working Group, Request for Comments: 4113, The Internet Society.
Y. Rekhter, et al., "A Border Gateway Protocol 4 (BGP-4)," Jan. 2006, 104 pages, Network Working Group, Request for Comments: 4271, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.

(56) References Cited

OTHER PUBLICATIONS

E. Rosen, et al., "BGP/MPLS IP Virtual Private Networks (VPNs)," Feb. 2006, 47 pages, Network Working Group, Request for Comments: 4364, The Internet Society.

J. Polk, et al., "A Resource Reservation Protocol (RSVP) Extension for the Reduction of Bandwidth of a Reservation Flow," May 2006, 21 pages, Network Working Group, Request for Comments: 4495, The Internet Society.

Z. Ali, et al., "Node-ID Based Resource Reservation Protocol (RSVP) Hello: A Clarification Statement," Jun. 2006, 7 pages, Network Working Group, Request for Comments: 4558, The Internet Society.

J. Babiarz, et al., "Configuration Guidelines for DiffServ Service Classes," Aug. 2006, 57 pages, Network Working Group, Request for Comments: 4594, The Internet Society.

K. Kompella, et al., "Virtual Private LAN Service (VPLS) Using BGP for AutoDiscovery and Signaling," Jan. 2007, 28 pages, Network Working Group, Request for Comments: 4761, The IETF Trust.

M. Lasserre, et al., "Virtual Private LAN Service (VPLS) Using Label Distribution Protocol (LDP) Signaling," Jan. 2007, 31 pages, Network Working Group, Request for Comments: 4762, The IETF Trust.

L. Andersson, et al., "LDP Specification," Oct. 2007, 135 pages, Network Working Group, Request for Comments: 5036, The IETF Trust.

R. Coltun, et al., "OSPF for IPv6," Jul. 2008, 94 pages, Network Working Group, Request for Comments: 5340, The IETF Trust.

L. Eggert, et al., "Unicast UDP Usage Guidelines for Application Designers," Nov. 2008, 27 pages, Network Working Group, Request for Comments: 5405, IETF Trust and the persons identified as the document authors.

F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

\* cited by examiner

Routing Request 192: <Source, Destination, Requested capacity, NF Chain>
Routing Request 194: <Source, Destination, Ingress Node, Egress Node, Requested Capacity, NF Chain>

NF Chain 196: {F1, F2, F3}
NF Chain 198: {F1, (F2, F3)}

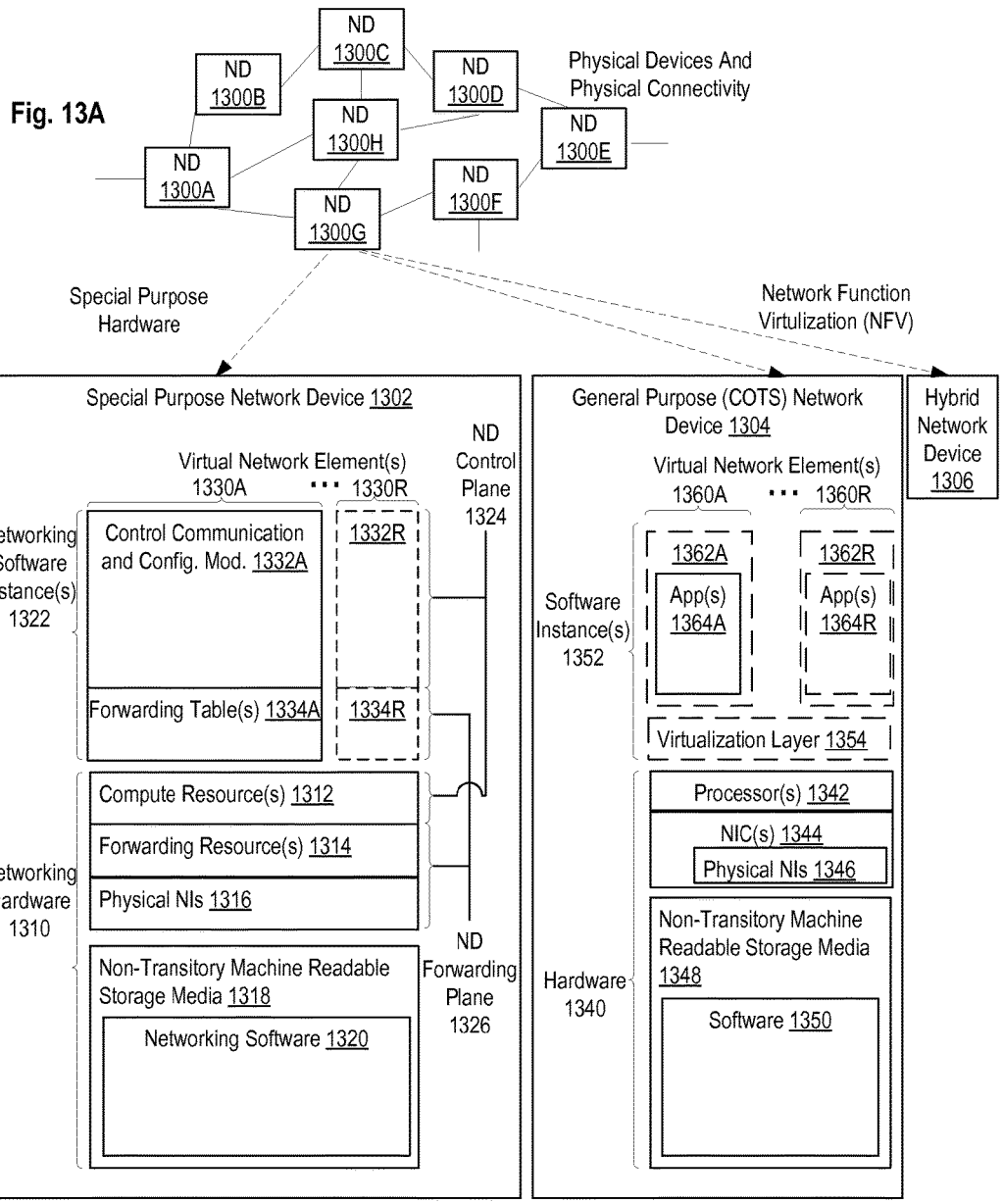

METHOD AND SYSTEM FOR ROUTING A NETWORK FUNCTION CHAIN

FIELD OF INVENTION

The embodiments of the invention are related to the field of networking. More specifically, the embodiments of the invention relate to a method and system for routing a network function chain.

BACKGROUND

Service providers often struggle with network function chaining, which is the process of steering a traffic flow across a predefined set of network functions. Traditionally, operators made use of bump-in-the wire strategy or policy based routing (PBR) to achieve the desired network function chain. However, these approaches lack the required flexibility where a network function chain could be determined dynamically based on, for example, source or destination address, application type and other service level agreements or operator policies.

The recent advances in software engineering and high-performance commodity servers facilitate virtualization of network function (NFs). NFs traditionally delivered on proprietary and application-specific equipment now can be realized in software running on generic server hardware (e.g., commercial off-the-shelf (COTS) servers). The technology, coined as network function virtualization (NFV), is gaining increasing popularity with network operators.

NFV may be implemented at various parts of a network, such as at a serving gateway (S-GW), packet data network gateway (P-GW), serving GPRS (general packet radio service) support node (SGSN), gateway GPRS support node (GGSN), broadband remote access server (BRAS), and provider edge (PE) routers. NFV can also be implemented to support various services also called appliances or middle-boxes, such as content filter, deep packet inspection (DPI), firewall (FW), virus scanning (VS), Intrusion Detection and Prevention (IDP), and network address translation (NAT), etc.

The flexibility offered by NFV allows more dynamic deployments of the traditional network functions, in various locations such as the operator's cloud or even central offices and point of presences (POPs) where a smaller scale data center may reside. For the purpose of load balancing or latency, one type of network function may be instantiated and hosted at multiple locations providing the same functions (i.e., multiple instances of the same network function).

When configuring a network function chain in a network, the multiple instances of a required network function may present different costs: 1) the cost associated with using a particular network function instance; 2) networking cost to that instance in the network function chain; and 3) the impact on the cost of the remaining part of the chain. In routing a network function chain, these costs need to be considered in aggregation.

In addition, the configuration of a network function chain includes the determination of the location of all the required network functions and the most efficient routing across the network functions. NFV further places the network function chaining problem into a more challenging context. As NFV allows virtual network function (vNF) deployment when and where needed, there would not be fixed locations to host certain network functions. Thus, for each network function chain, the service providers need to dynamically evaluate the network functions' and network's states.

SUMMARY

A first method for selecting a path for a network function chain is disclosed. The method is implemented in an electronic device coupled to a network including a plurality of network elements. In the network, traffic flows of the network pass through network function chains and each network function is associated with at least one network element. The method includes For each of a plurality of network functions of a network function chain, the method includes generating a subgraph, where a representation of each of the plurality of network elements is split into two vertexes, and one edge is added between the split two vertexes of each network element that hosts that network function of the subgraph. Then the subgraphs are ordered according to an order of the plurality of network functions of the network function chain, and connected to form a graph, wherein for each ordered subgraph except the last ordered subgraph, each vertex with an edge in the ordered subgraph being connected with an edge to another vertex with an edge in the next ordered subgraph, each connection including all paths of the network between a pair of network elements represented by the vertexes connected with the edge. Each edge in the graph includes a cost measure. The method also includes determining vertexes of a representation of a source network element and a representation of a destination network element in the graph and selecting a path from the vertex of the representation of the source network element to the vertex of the representation of the destination network element in the graph to identify a route through the plurality of network functions of the network function chain, where each edge of the path is selected based on at least its cost measure.

A second method for selecting a path for a network function chain is disclosed. The method is implemented in an electronic device coupled to a network including a plurality of network elements. In the network, traffic flows of the network pass through network function chains and each network function is associated with at least one network element. The method includes calculating a set of lowest cost paths for each pair of network elements of the plurality of network elements, where each lowest cost path includes one cost measure of the lowest cost path between that pair. For each of the plurality of network functions, the method generates a subgraph, where a representation of each of the plurality of network elements is split into two vertexes, and one edge is added between the split two vertexes of the representation of each network element that hosts that network function of the subgraph. Then the subgraphs are ordered according to an order of the plurality of network functions of the network function chain, and connected to form a graph, where for each ordered subgraph except the last ordered subgraph, each vertex with an edge in the ordered subgraph is connected, with at least one edge, to another vertex with an edge in the next ordered subgraph, where each connection between vertexes in different ordered subgraphs is associated with at least one path but no more than the calculated set of lowest cost paths for the pair of network elements with representation vertexes connected by the at least one edge. Each edge in the graph includes a cost measure. The method also includes determining vertexes of a representation of a source network element and a representation of a destination network element in the graph and selecting a path from the vertex of the representation of the source network element to the vertex of the representation of the destination network element in the graph to identify a route through the plurality of network functions of the network function chain, where each edge of the path is selected based on at least its cost measure.

A first non-transitory machine-readable medium for selecting a path for a network function chain is disclosed. The non-transitory machine-readable medium has instructions stored therein, which when executed by a processor, cause the processor to perform operations in an electronic device coupled to a network including a plurality of network elements. In the network, traffic flows of the network pass through network function chains and each network function is associated with at least one network element. The operations include that, for each of a plurality of network functions, generating a subgraph, where a representation of each of the plurality of network elements is split into two vertexes, and one edge is added between the split two vertexes of each network element that hosts that network function of the subgraph. Then the subgraphs are ordered according to an order of the plurality of network functions of the network function chain, and connected to form a graph, wherein for each ordered subgraph except the last ordered subgraph, each vertex with an edge in the ordered subgraph being connected with an edge to another vertex with an edge in the next ordered subgraph, each connection including all paths of the network between a pair of network elements represented by the vertexes connected with the edge. Each edge in the graph includes a cost measure. The operations also include determining vertexes of a representation of a source network element and a representation of a destination network element in the graph and selecting a path from the vertex of the representation of the source network element to the vertex of the representation of the destination network element in the graph to identify a route through the plurality of network functions of the network function chain, where each edge of the path is selected based on at least its cost measure.

A second non-transitory machine-readable medium for selecting a path for a network function chain is disclosed. The non-transitory machine-readable medium has instructions stored therein, which when executed by a processor, cause the processor to perform operations in an electronic device coupled to a network including a plurality of network elements. In the network, traffic flows of the network pass through network function chains and each network function is associated with at least one network element. The operations include calculating a set of lowest cost paths for each pair of network elements of the plurality of network elements, where each lowest cost path includes one cost measure of the lowest cost path between that pair. For each of the plurality of network functions, the operations include generating a subgraph, where a representation of each of the plurality of network elements is split into two vertexes, and one edge is added between the split two vertexes of the representation of each network element that hosts that network function of the subgraph. Then the subgraphs are ordered according to an order of the plurality of network functions of the network function chain, and connected to form a graph, where for each ordered subgraph except the last ordered subgraph, each vertex with an edge in the ordered subgraph is connected, with at least one edge, to another vertex with an edge in the next ordered subgraph, where each connection between vertexes in different ordered subgraphs is associated with at least one path but no more than the calculated set of lowest cost paths for the pair of network elements with representation vertexes connected by the at least one edge. Each edge in the graph includes a cost measure. The operations also include determining vertexes of a representation of a source network element and a representation of a destination network element in the graph and selecting a path from the vertex of the representation of the source network element to the vertex of the representation of the destination network element in the graph to identify a route through the plurality of network functions of the network function chain, where each edge of the path is selected based on at least its cost measure.

Embodiments of the disclosed techniques provide ways to improve network function chain routing so that traffic flows are routed more efficiently through network functions for a specified network function chain. Through embodiments of the disclosed techniques, network function chain routing may be optimized using graph manipulation and selection of low cost paths.

BRIEF DESCRIPTION OF THE DRAWINGS

The present invention is illustrated by way of example, and not by way of limitation, in the figures of the accompanying drawings in which like references indicate similar elements.

FIG. 13A illustrates connectivity between network devices (NDs) within an exemplary network, as well as three exemplary implementations of the NDs, according to some embodiments of the invention.

FIG. 13B illustrates an exemplary way to implement a special-purpose network device according to some embodiments of the invention.

DETAILED DESCRIPTION

Figure 1:
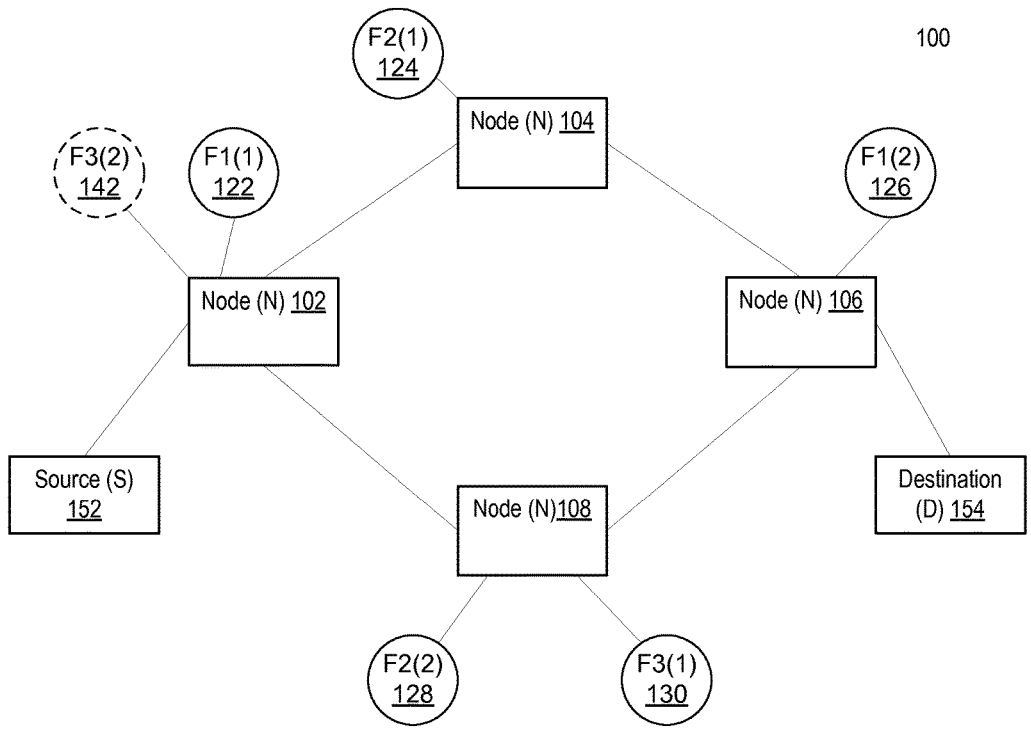
FIG. 1 illustrates a network in which a network function chain is required to be routed according to one embodiment of the invention.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. A network device is an electronic device. A network element, as explained in more details herein below, is implemented in one or more network devices.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). As explained in more details herein below, a network element may be implemented in one or more network devices, and a network device may implement one or more network elements.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Network Function Chaining

Network function virtualization (NFV) allows legacy network functions traditionally offered by specialized equipment to run in software on generic hardware. Through NFV, virtualized network functions (vNFs) in high-performance commodity servers may be deployed in a service provider's data center (DC), with great flexibility to spin on/off the vNFs on demand. Thus, VNF as a Service (VNFaaS) may be offered. Instead of network users (e.g., an enterprise or a small network operator) investing on their own infrastructure, platform, and software, a VNFaaS service provider can provide the required vNF instances and networking resources with service fee charged to the network users (also referred to as network clients, tenants, or end-users).

A traffic flow is steered through a set of network functions, and the network function chaining requires an efficient way to route a traffic flow through the network function chain. It is to be noted that the term "network function" has been referred to as "service function" (used by, e.g., the Internet Engineering Task Force (IETF)), "middlebox" (often associated with legacy implementation of network functions), or "service type," and these terms have the same meaning and are used interchangeably in this specification. It is also to be noted that the IETF uses a service function chain as an abstract concept that specifies what is needed to provide a service in what order; and the IETF uses a service function path as a realization of a service function chain, and the service function path specifies which network functions are selected and the network path interconnecting them. Thus, the service function chain and service function path in the IETF correspond to and are the same as, or similar to (e.g., similarly implemented), the network function chain and the selected path for the network function chain as discussed herein below. The embodiments of the invention apply to not only a network function chain of vNFs, but also a network function chain of legacy network functions or a network function chain of mixed vNFs and legacy network functions. A traffic flow may be defined as a set of packets whose headers match a given pattern of bits, and a traffic flow may be identified by a set of attributes embedded in one or more packets of the traffic flow.

Both vNFs and legacy network functions can be deployed before being selected for a specific network function chain. The a priori deployment considers estimated traffic demand, network topology, and cost functions for various aspects such as locations, usage of instances, operational costs, etc. It can achieve a high level of optimality due to global optimization and flexibility for arrangement given that a good demand matrix estimate is available. Both vNFs and legacy network functions can also be added in response to a demand increase. For vNFs, a network function may be instantiated in a server connected at a network element, as long as cloud and network resources have been pre-planned for the vNF at the network element; similarly, for legacy network functions, a network function may be executed (e.g., installing physically, turning on a hardware/software module at the network element) when the legacy network function is planned at the network element. Embodiments of the invention assume that the network functions have been deployed or planned at various network elements of a network. It is to be noted that while the examples about network function chaining use vNFs as examples, embodiments of the invention apply to legacy network functions as well as a mix of vNFs and legacy network functions.

Often, there are multiple instances of the same network function hosted at various network elements. The multiple instances often are for load balancing or for meeting latency requirements. Each instance may provide the same network function when used in a network function chain. The routing of a traffic flow through a network function chain may be viewed as selecting the network function path that addresses two issues: for each required network function, to select the right or best instance from one or more choices; and to determine the network function path chaining through all the selected network function instances. In some cases, an order of the network functions as well as capacity constraints (both in terms of network and processing limitations) and administrative reasons may restrict the choices.

Given a static network function instance deployment and network state, mathematical programming (e.g. integer linear programming (ILP)) can be employed as a solution to compute the optimal selection of network function instances and route for each network function chain. However, there are often limitations when implementing ILP techniques directly in the system:

ILPs often don't scale as the problem grows (i.e., computation complexity grows exponentially as the network size grows);

ILPs require specific solver software, where the ones that perform well are not free; and ILPs require domain expertise, and each time a new constraint is to be added, the ILP code needs to be changed properly.

There are several proposals to address network function placement known in the art. Those proposals are concerned with the initial placement of network functions. In contrast, embodiments of the invention provide an efficient way to address routing through a network function chain, once the initial placement of network functions is determined (e.g., network functions are either deployed or planned).

A Graph Abstraction

FIG. 1 illustrates a network in which a network function chain is required to be routed according to one embodiment of the invention. Network 100 contains four nodes 102-108 and multiple links connect the nodes. Instances of network functions are deployed at various nodes, illustrated with solid cycles:

Network function F1 at nodes 102 and 106 (F1(1) and F1(2) at references 122 and 126 respectively);

Network functions F2 at nodes 104 and 108 (F2(1) and F2(2) at references 124 and 128 respectively); and Network function F3 at node 108 (F3(1) at reference 130).

An instance of a network function, network function F3(2) at reference 142, is planned at node 102. The planned instance is an instance that can be initiated when needed. For example, node 102 has the capability to host F3 (e.g., a network function of firewall), but node 102 is not currently hosting F3 as there is currently no demand for the additional F3 instance, F3(2). When the demand increases, F3(2) may be instantiated at node 102, often at an additional cost. Thus, the routing of a network function chain may consider the planned but not the deployed network functions, too.

It is to be noted that network functions F1-F3 are illustrated as connected to various nodes. The network functions may be hosted by the nodes, within hardware and/or software modules within or coupled to the various nodes.

Network 100 contains a source and a destination at references 152 and 154 respectively. The source and destination may be nodes similar to nodes 102-108 as nodes of network 100, but the source and destination may also be end user devices different from nodes 102-108. In one embodiment, both source/destination and nodes are network elements implemented in network devices.

When a traffic flow is to be routed through network 100, a routing request of a network function chain may be received. In one embodiment, the routing request takes the form of a routing request 192, which includes a source, destination, a required capacity such as bandwidth of the network function chain, and a network function chain in one embodiment. In an alternative embodiment, the routing request takes the form of a routing request 194, which is similar to routing request 192 but with additional elements of an ingress node and an egress node, in which case the source and destination are not nodes of the network and the traffic flow will enter the ingress node from the source and exit the egress node to the destination.

The network function chain is given in an order. In some embodiments, the traffic flow needs to follow the order of the network functions as given by the routing request in routing through the network functions. In other embodiments, the traffic flow may be routed through the network functions in a different order of the network functions than that given by the routing request. An example network function chain 196 is {F1, F2, F3}, and the curly brackets without any other symbol within indicates that the network functions within the curly brackets are required to follow the order as listed. Another example network function chain is chain 198 {F1, (F2, F3)}, where the parentheses indicate that the network functions within the curly brackets are not required to follow the order as listed. In this example, a route of either {F1, F2, F3} or {F1, F3, F2} would satisfy the request for routing network chain 198. The chain {F1, F2, F3} may also be referred to as a strict-ordered network function chain. The chain of {F1, (F2, F3)} may also be referred to as a loose-ordered network function chain, as a portion of the set of network functions does not require a specific order in routing. Similarly, a chain like {(F1, F2, F3)} is a network function chain that may be referred to as a not-ordered network function chain.

Figure 2:
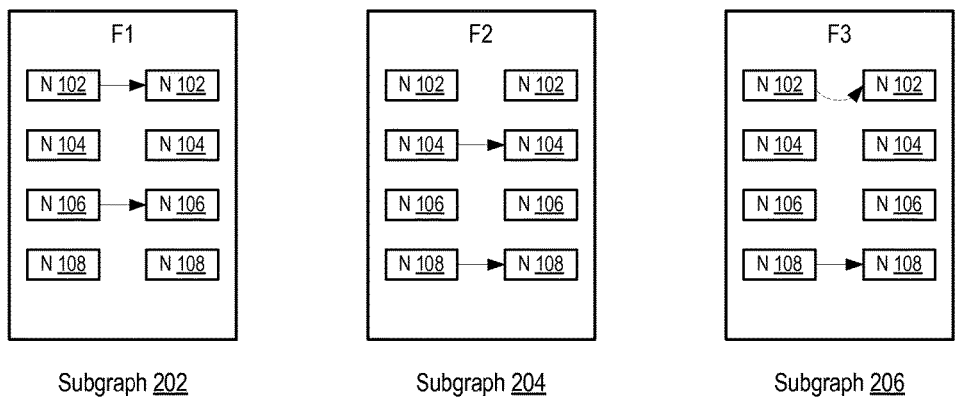
FIG. 2 illustrates subgraphs generated for network functions according to one embodiment of the invention.

FIG. 2 illustrates subgraphs generated for network functions according to one embodiment of the invention. For each network function of a network function chain, a subgraph is generated, and subgraphs 202, 204, and 206 are for network functions F1, F2, and F3 respectively. The subgraphs are so referred as they are the building blocks to form a graph that contains vertexes and edges representing a network. The ordering of subgraphs 202-206 for network functions F1-F3 in the figure represents the strict order of the chain {F1, F2, F3}.

Referring to subgraph 202 that is for network function F1, a representation of each of the nodes of network 100 is split into two vertexes; thus, there are four rows of two vertexes, one row representing each node. If a node hosts an instance of network function F1, a directed edge is added from a first vertex to a second vertex of the node's representation. Since network function F1 is hosted at nodes 102 and 106, a directed edge is added between the split vertexes of each of the representations of nodes 102 and 106. Similarly, in the subgraph 204 that is for network function F2, a directed edge is added between the split vertexes of each of the representations of nodes 104 and 108; and in the subgraph 206 that is for network function F3, a directed edge is added between the split vertexes of the representation of node 108.

It is to be noted that directed edges are illustrated in the formation of the graph for routing. The directed edges are for illustration of selection of routing from the source to the destination. Often routing in a graph is symmetric. That is, the lowest cost path from the source to the destination is also the lowest cost path from the destination to the source. In that case, a graph may be formed with edges without direction indicated, and the resulting path may be used bi-directionally, applying the same or similar embodiments of the invention. The operations are similar to those of the directed graph discussed below and they are not repeated for the bidirectional cases, for the sake of brevity.

It is to be noted that a dotted directed edge is added between the two vertexes for the representation of node 102 in subgraph 206. The dotted directed edge is for the representation of a node that has the capability to host a network function yet currently does not host the network function (e.g., the node being one where a vNF is planned at the node but is not currently instantiated). Each directed edge within the subgraph is associated with at least a cost measure. In one embodiment, the cost measure of a solid directed edge is the cost of running the network function associated with the subgraph on the node, and the cost measure of a dotted directed edge is the cost of instantiating the network function and running the network function associated with the subgraph on the node. Typically, the cost measure of the solid directed edge is different from the one of the dotted directed edge for the same subgraph and the same node, and the former cost measure is often lower than the latter cost measure.

Figure 3:
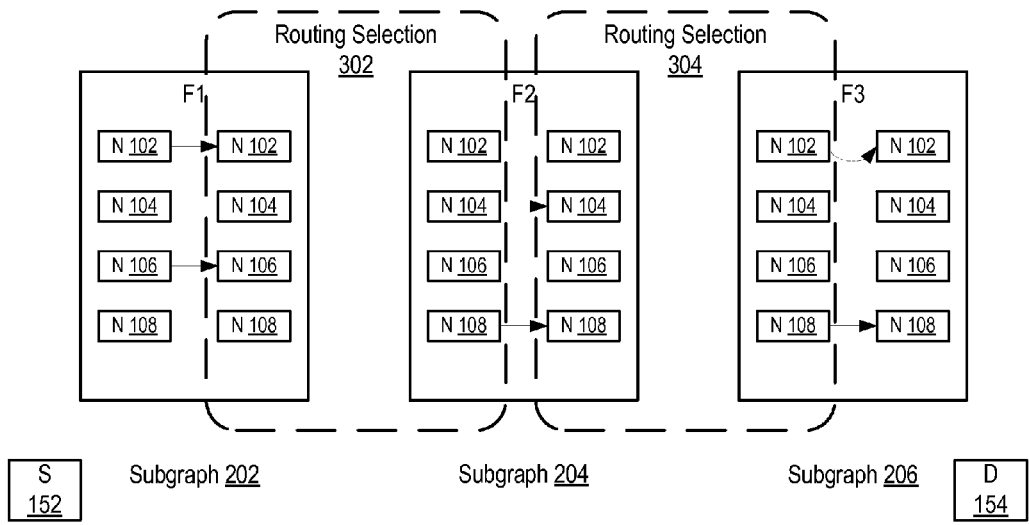
FIG. 3 illustrates routing selections connecting subgraphs according to one embodiment of the invention.

FIG. 3 illustrates routing selections connecting subgraphs according to one embodiment of the invention. FIG. 3 includes all the elements of FIG. 2, and FIG. 3 further includes a representation of the source 152 and a representation of the destination 154 to formulate the path selection problem for network function chain 196, {F1, F2, F3}. Network function chain 196 requires the given order of F1→F2→F3 to be kept in routing the traffic flow. Thus, what needs to be determined is how to route the traffic flow from network function F1 to network function F2 (illustrated as routing selection 302 from subgraphs 202 to 204), and how to route the traffic flow from network function F2 to network function F3 (illustrated as routing selection 304 from subgraphs 204 to 206). Routing selections 302 and 304 are determined as the inter network function routing. For routing selection 302, since network function F1 is hosted only at nodes 102 and 106, and network function F2 is hosted only at nodes 104 and 108, the task is to select the best route from nodes 102 or 106 to nodes 104 or 108. Similarly, for routing selection 304, the task is to select the best route from nodes 104 or 108 to nodes 102 or 108, presuming the routing of the network function chain 196 may consider the planned F3 instance, F3(2). Two modes of operations, a base mode and a base+mode, may be implemented to select the best route according to embodiments of the invention. As discussed in more details herein below, the base mode aims at providing the routing selection from an exhaustive search of the routing alternatives, while the base+mode aims at providing a more computationally efficient solution in making the route selection. Other solutions that are between the base mode and the base+mode (e.g., less computationally exhaustive than the base mode and more computationally exhaustive than the base+mode) can be implemented utilizing principles of embodiments of the invention.

Operations of Base Mode

Figure 4:
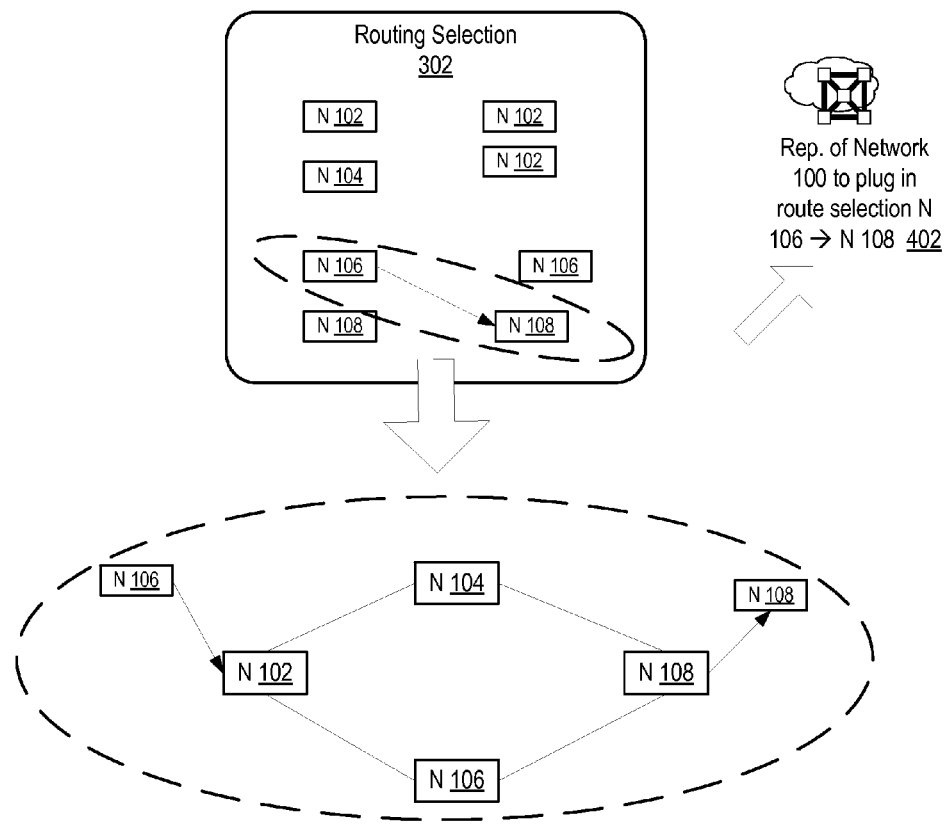
FIG. 4 illustrates the routing options from one node to another according to one embodiment of the invention.

In the base mode operations, the inter network function routing computes the best route(s) among all the possible routes from one node to another, each node associated with a network function (e.g., the nodes include both the nodes hosting a network function and the nodes with the capability of hosting, but currently not hosting, the network function). FIG. 4 illustrates the routing options from one node to another according to one embodiment of the invention. As discussed herein above, for routing selection 302, the task is to select the best route from nodes 102/106 to nodes 104/108. As an example, the routing options from node 106, which is in subgraph 202 (not shown) for network function F1, to node 108, which is in subgraph 204 (not shown) for network function F2, are illustrated in this figure. One way to illustrate and determine all the routing options between two nodes is to plug in a representation of the network in the graph. In this example, the representation of network 100 is plugged into the graph (i.e., between the subgraphs 202 and 204) for the routing selection 302 from the representation of node 106 to the representation of node 108. As illustrated, the representation of network 100 replaces the dotted link from the representation of node 106 to the representation of node 108. The representation of network 100 is denoted as reference 402. It is to be noted that although only the plugging-in between representations of nodes 106 and 108 is illustrated, the representation of network 100 is also plugged in between representations of nodes 102 and 108, between representations of nodes 102 and 104, and between representations of nodes 106 and 104, as these are also possible routes from subgraph 202 to subgraph 204.

Each edge in the routing selection also includes a cost measure that indicates the cost of selecting the edge as a path from one node to another, where each node is associated with a network function in a network function chain. The cost measure may be calculated based on at least one of the following: a hop count between the two nodes (i.e., cost of one associated with each edge between hops), a time delay between the two nodes (e.g., an estimated time taken in milliseconds/seconds or in a unit of time taken to route between the two nodes), a distance measure between the two nodes (e.g., a measured/estimated physical distance between the two nodes), an inverse capacity measure (e.g., one divided by the link capacity of the link between the two nodes), and an administrative cost (e.g., an operator-assigned cost to influence routing between the two nodes). It is to be noted that this is not an exclusive list of all possible cost measures, and that other cost measures, individually or in combination with others including the enumerated cost measures, may be utilized to determine the cost of the edges. The cost of connecting a representation of the ingress node (e.g., node 106 for the routing selection 302) and a representation of the egress node (e.g., node 108 for the routing selection 302) to the representation of the network is considered zero, and the costs within the representation of network 100 are calculated based on the cost measure.

The representation of network 100 includes representations of all the nodes of the network according to one embodiment. It is to be noted that representations of the source and destination at references 152 and 154, respectively, are not included in the representation of network 100, as the source and destination are not considered nodes that host or are capable of hosting but are not currently hosting any network function, in this example. In an embodiment that the source and destination do host or are capable of hosting but are not currently hosting one or more network functions, the source and destination will be included in the representation of network 100.

In an alternative embodiment, the representation of a network that plugs into the graph may be an abstraction of the network without including representations of all the nodes. For example, when a network contains hundreds or thousands of nodes, plugging in the network for a selection of route from one node to another may be less efficient, as the possible paths and associated calculation of cost measures to determine the best route is too computation intensive. In that case, the large network may be abstracted to smaller sets of node clusters, where each set contains a set of nodes. Thus, the representation of the network would not include representations of all the nodes in the network but would still be able to represent the possible routes from one node to the other.

Figure 5:
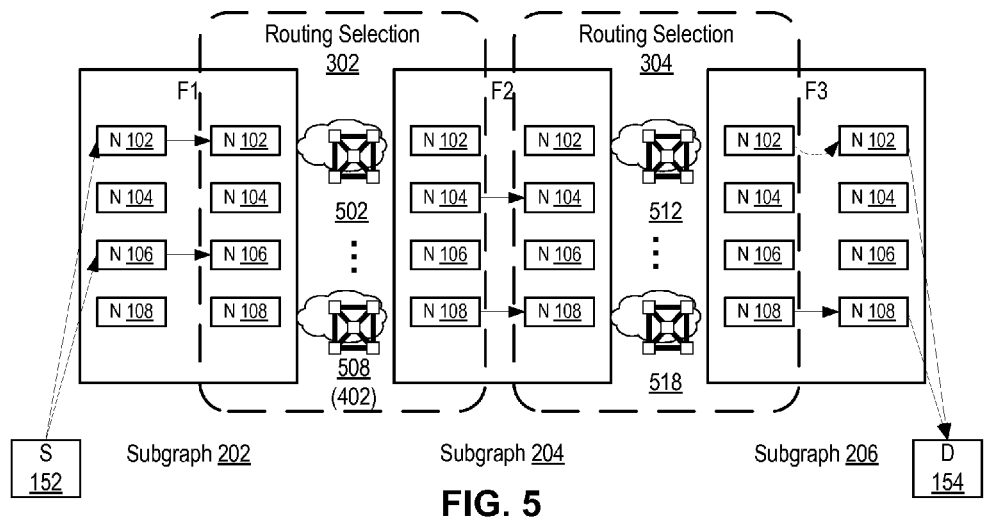
FIG. 5 illustrates a path selection from a source to a destination for a network function chain according to one embodiment of the invention.

FIG. 5 illustrates a path selection from a source to a destination for a network function chain according to one embodiment of the invention. FIG. 5 includes all the elements of FIG. 3, and additionally the routing selections are implemented. Referring to FIG. 5, the representation of network 100 is plugged into the graph for each possible route from network function F1 to network function F2, and from network function F2 to network function F3. For example, in routing selection 302, the representation of network 100 is repeated for the routes from node 102 to node 104, node 102 to node 108, node 106 to node 104, and node 106 to node 108. The representations are illustrated as references 502 to 508, where reference 508 is the same representation of network 100 at reference 402 of FIG. 4, as this representation of network 100 is from node 106 to node 108. Similarly, in routing selection 304, the representation of network 100 is repeated for the routes from node 104 to node 102, node 104 to node 108, node 108 to node 102, and node 108 to itself. The representations are illustrated as references 512 to 518. Thus, with all the representations of the network 100 plugging into the graph, the possible routes from network function F1 to network function F2 and from network function F2 to network function F3 are represented in FIG. 5.

Additionally, FIG. 5 illustrates the possible routes from the representation of the source 152 to the representations of the nodes associated with (e.g., hosting) network function F1 and from the representations of the nodes associated with (e.g., hosting or capable of hosting but not currently hosting) network function F3 to the representation of the destination 154. The directed edges connecting the representation of the source 152 and the representation of the destination 154 include cost measures calculated similarly to the cost measures of the directed edges in routing selections 302 and 304 discussed herein above.

When the cost measures of all the edges in the graph are determined, the task of routing a traffic flow through the network function chain in the graph is to find a route from the representation of the source to the representation of the destination. In one embodiment, the best route is the path with the lowest overall cost in routing the traffic from the representation of the source to the representation of the destination. With the cost of all the edges known, a software module within the path control element (PCE) (implemented in an electronic device) may perform the calculation and find the path with the lowest cost. It is to be noted the path with the lowest cost is selected in this embodiment without considering any capacity requirement of the requested network function chain.

However, a request to route a network function chain may include a capacity requirement as illustrated with routing requests 192 and 194 of FIG. 1. That is, the routing request indicates how much capacity is required to route the network function chain in the network, and/or the capacity needed by required network functions. The required capacity may be network bandwidth needed to route the network function chain, for example. Thus, edges may additionally include capacity measures. The capacity measure of a particular edge may indicate a particular capacity limit of the edge in some embodiments. For example, the capacity measure for an edge from a representation of a source to a representation of a node associated with a network function (e.g., from the representation of the source 152 to the representation of the node 102 and from the representation of the source 152 to the representation of the node 106 as illustrated in FIG. 5) may be the bandwidth capacity of the links from the source to the node. Similarly, the capacity measure for an edge within the routing selection portion such as routing selections 302 and 304 may be the bandwidth capacity of the links in network 100.

The capacity measure for a directed edge within the subgraphs for network functions may be calculated differently in one embodiment. Since a subgraph represents a network function deployed or planned in nodes, the capacity measure for the directed edge between the vertexes of a node's representation may be calculated as the capacity available by the network function hosted or planned for hosting on the node, for example.

When the edges additionally include capacity measures, the selection of the best route preferably considers capacity measures. In one embodiment, after the graph for routing a network function chain is formed (e.g., subgraphs are connected with each other and with the representations of the source and destination), the method then prunes the graph and removes the edges that do not satisfy the required capacity of the network function chain (e.g., as specified in a routing request). After the pruning, the remaining edges of the graph do have sufficient capacity to route the network function chain, although at the end of the method, another check may be needed as the same edge may have been selected more than once.

It is to be noted that pruning may also be performed for administrative reasons. For example, some links between nodes associated with two consecutive network functions in the network function chain may be too congested based on the service provider's own policy; other links may have a higher error rate than agreeable to the particular network client requesting the network function chain based on a service level agreement (SLA). These constraints, often related to operation policy, customer requirement, and network characteristics, may be considered by removing the edges that do not satisfy them.

Then the method may select the lowest cost paths (e.g., using K shortest path computation) for the requested network function chain between the source and destination. Once the lowest cost paths are obtained, the method needs to verify the lowest cost paths in ascending order of cost to assure that the capacity limit of a given edge is not violated. The first lowest cost path that is verified is selected as the best solution (i.e., the path that satisfies the capacity limit with the lowest cost). The traffic flow can be routed based on the selected path. It is to be noted that there are known ways to select the lowest cost paths, once the cost of the edges in the route is known. For example, K-Shortest Path algorithms (e.g., based on the Dijkstra's shortest path routing algorithm) may be utilized.

The lowest cost path selection above applies to the scenarios that a particular order of the network function chain is to be maintained. For example, the network function chain 196 is required to be in the strict-order F1→F2→F3 as the given order of the chain is {F1, F2, F3}. Other chains require only loose order or do not require any order. For example, the network function chain 198 is a loose-ordered chain, as the given order of the chain is {F1, (F2, F3)}. For a loose-ordered chain, each order permutation should be considered in selecting the shortest cost path.

Figure 6:
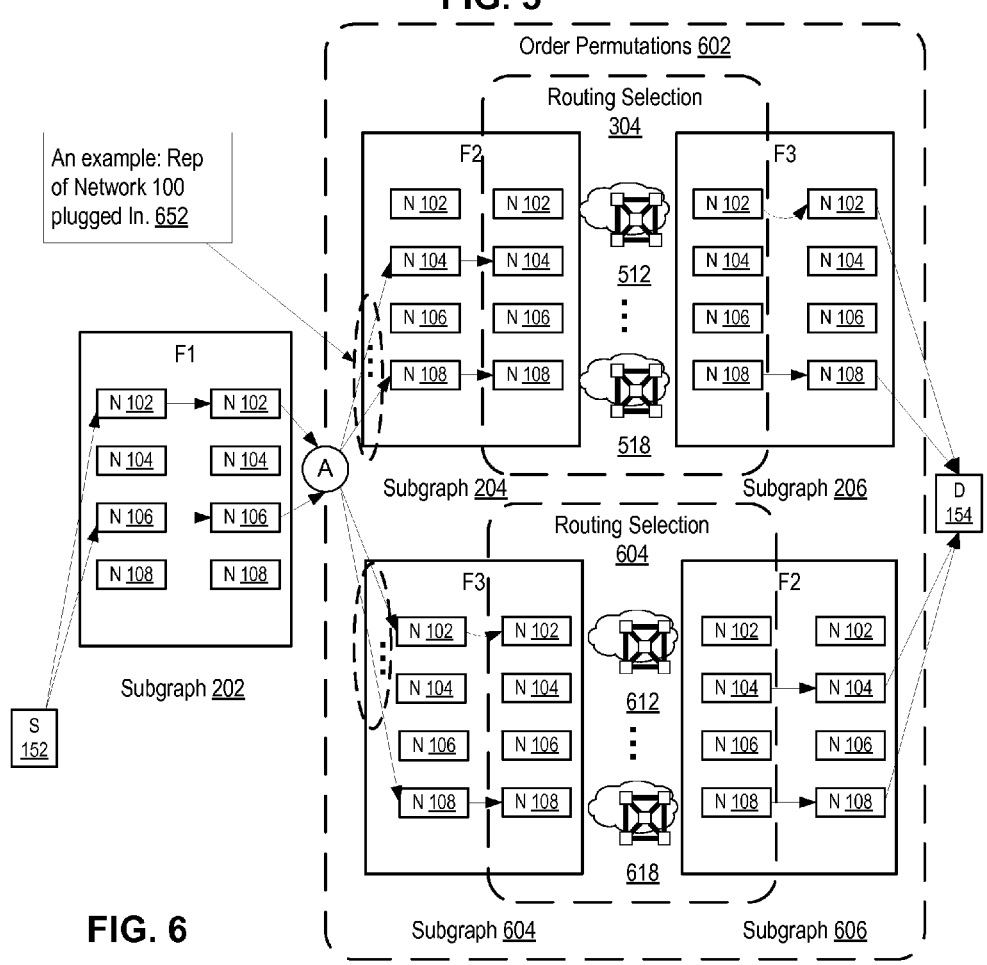
FIG. 6 illustrates selections from a source and to a destination for a loose-ordered network function chain according to one embodiment of the invention.

FIG. 6 illustrates selections from a source and to a destination for a loose-ordered network function chain according to one embodiment of the invention. FIG. 6 includes all the elements of FIG. 5, and additional entities and connections are added to accommodate order permutations. For network function F1, its connection to the representation of the source 152 remains the same. Network function F1's connection to network functions F2 and F3 are more complicated. Since each order permutation presents a different network function order, each order permutation is given a row in order permutation 602. The first permutation is from network function F2 to network function F3, which contains the entities in the ones in FIG. 5 for network functions F2 and F3. The second permutation is from network function F3 to network function F2, and the second permutation contains duplicated subgraphs from subgraphs 206 and 204 at subgraph 604 and 606, respectively. Between the subgraphs 604 and 606 are representations of network 100 at references 612 to 618, similar to the representation of network 100 at references 502-508 discussed herein above. The representations of nodes in subgraphs 206 and 606 (i.e., the later-ordered subgraphs immediately following subgraphs 204 and 604, respectively, in the corresponding permutations) that receive the directed edges (thus associated with the respective network functions) have a directed edge to the representation of the destination 154.

The directed edges out of network function F1 may be viewed to be connected to cycle A, which then connects to each row of order permutations of network functions F2 and F3. Each connection to each row of order permutations 602 is included in a representation of network 100, similar to the one illustrated in FIG. 4. As illustrated, the representations of network 100 are plugged into the graph at reference 652 for each representation of a node associated with network function F1. For example, for node 102, the representations of network 100 include the ones from the representation of node 102 (at subgraph 202) to the representation of node 104 (at subgraph 204), from the representation of node 102 (at subgraph 202) to the representation of node 108 (at subgraph 204), from the representation of node 102 (at subgraph 202) to itself (at subgraph 604), and from the representation of node 102 (at subgraph 202) to the representation of node 108 (at subgraph 604). The same representations of network 100 plug-ins apply to the representation of node 106 (at subgraph 202).

Through order permutations 602 and added edges, the graph for routing the loose-ordered network function chain is generated. After the graph is generated, the routing is similar to the one discussed in relation to FIG. 5. The cost measure and the capacity measure may form the basis of the selection of the lowest cost path. The pruning may be performed and the edges in the graph may be removed for capacity and/or administrative reasons.

Flow Diagram for the Base Mode

Figure 7:
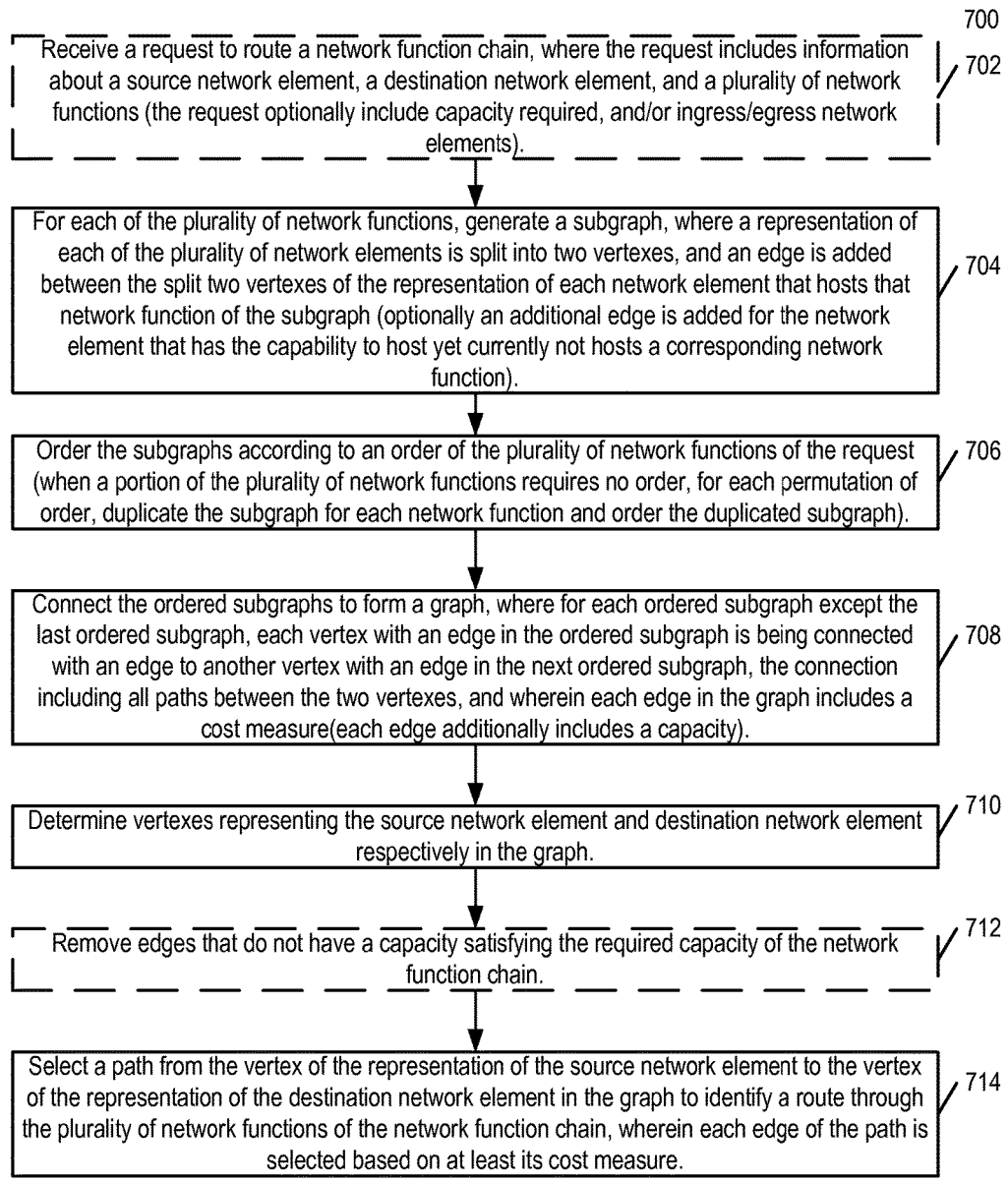
FIG. 7 is a flow diagram illustrating the operations of the base mode according to one embodiment of the invention.

FIG. 7 is a flow diagram illustrating the operations of the base mode according to one embodiment of the invention. Method 700 may be implemented on an electronic device serving as the path computation element (PCE) of a network that includes a plurality of network elements. In the network, traffic is routed as a set of traffic flows, and each traffic flow passes through a network function chain including one or more network functions. The network function may be a legacy network function or a virtual network function through network function virtualization (NFV) implemented in a hardware/software module coupled to or within a network device implementing a network element.

At reference 702, a request may be received to route a network function chain. The request includes information about a source network element, a destination network element, and a plurality of network functions. The request is for a traffic flow to route through the network function chain in one embodiment. The request additionally includes a capacity required for the network function chain in one embodiment. The request may also include an ingress network element and/or an egress network element as the required ingress and/or egress points of the network function chain.

At reference 704, for each of the plurality of network functions of the network function chain, a subgraph is generated. In the subgraph, a representation of each of the plurality of network elements is split into two vertexes, and an edge is added between the split two vertexes of the representation of each network element that hosts that network function of the subgraph.

In one embodiment, at least one additional edge is added in one subgraph between the split two vertexes of the representation of a network element that does not currently host that network function of the subgraph but that has the capability to host that network function of the subgraph. In one embodiment, the at least one additional edge includes a cost measure that is different from the cost measure of a directed edge between the split two vertexes of the representation of a network element that currently hosts that network function of the subgraph. For example, the cost measure for the edge (e.g., illustrated with the solid directed edge for node 108 in FIG. 2, subgraph 206) between the split two vertexes of the representation of a network element that currently hosts that network function of the subgraph may be the cost of operating/performing the network function associated with the subgraph, while the cost measure for the additional edge (e.g., illustrated with the dotted directed edge for node 102 in FIG. 2, subgraph 206) may be the cost of instantiating the network function and also operating/performing the network function associated with the subgraph. It is to be noted that when more than one edge exists after operations in reference 704 between the two split vertexes of a network element's representation in the subgraph (e.g., one edge for an existing instance of a network function and another for a possible additional instance for the same network function), the subgraph needs to be pruned so that only a single edge remains (e.g., the to-be-deployed instance of the network function may cost more than the existing instance of the network function, and the existing instance of the network function has the required capacity, thus the edge associated with the to-be-deployed instance of the network function is removed).

At reference 706, the subgraphs are ordered according to an order of the plurality of network functions of the network function chain (e.g., as identified in a request to route). At reference 708, the ordered subgraphs are connected to form a graph, wherein for each ordered subgraph except the last ordered subgraph (e.g., subgraph 206 of FIG. 3), each vertex with an edge in the ordered subgraph is connected with an edge to another vertex with an edge in the next ordered subgraph. The connection may be included in a representation of the network or determined using a representation of the network. The representation of the network is the plug-in of the network as illustrated in FIG. 4 in one embodiment, and thus, all the possible routes in the network between the two network elements can be included in the graph as edges connecting the vertexes of the two network elements' representations in the earlier-ordered and the next later-ordered subgraphs.

In some embodiments, the representation of the network is not the plug-in of the whole network. Instead, the representation of the network is a further abstraction of the network. For example, the network may be abstracted to a smaller number of vertexes and edges, and a cluster of network elements may be represented by a single vertex. Similarly, an edge of the abstraction of the network may be an aggregation of multiple links between network elements within a cluster.

Each edge in the graph includes a cost measure. As discussed herein above, the cost measure may be calculated in a variety of ways. The calculation may also be different for different segments of the graph. For example, the cost measure for the directed edges within a subgraph is discussed herein above in relation to reference 704. The cost measures for the edges connecting the subgraphs and connecting the source and destination network elements to the subgraphs may be different, and the cost measures may be based on at least one of a hop count between two network elements, a time delay between two network elements, a distance measure between two network elements, an inverse capacity measure, and an administrative cost, as discussed herein above in relation to FIG. 4.

In one embodiment, the formation of the graph for routing the network function chain further considers the order requirement of the network function chain. When the order of the requested network function chain is required to be followed in routing, the connection with the generated subgraph is sufficient. However, in some embodiments, the order of the requested network function chain is not required to be followed, and the network functions are allowed to be reordered in the network function chain to find the best route from the source network element to the destination network element. The relaxation of an order requirement may be indicated in the request to route itself, which may indicate a portion of the network function chain (e.g., the portion could be the whole chain or some smaller subset of the plurality of network functions) that does not need to be routed in a given order.

For the portion of the network function chain that does not require an order in routing the network functions, all the possible order permutations of the network functions in that portion are calculated. For the order permutations, the generated subgraph for each network function in that portion is duplicated, and the duplicated subgraphs are then ordered based on the particular order permutation of the corresponding network functions. As discussed in relationship to FIGS. 5-6, the representations of the network may be plugged into the graph between the duplicated subgraphs.

Referring back to FIG. 7, the flow continues to reference 710, wherein the vertexes of a representation of the source network element and a representation of the destination network element in the graph are determined. When existing vertexes of the graph represent the source network element and destination network element, the process just identifies the vertexes of the graph that represent the source network element and destination network element.

If the source network element or destination network element is not represented in the graph, a vertex of a representation of the missing source/destination network element is added in the graph. One or more directed edges are added to connect the added vertex to the existing vertexes of the graph. The connection to the representation of the source/destination network element is discussed earlier in relation to FIG. 5.

Optionally at reference 712, when a capacity is required for the network function chain (e.g., the routing requests 192 and 194 indicate the required capacity), the directed edges that do not have a capacity measure satisfying the required capacity of the network function chain are removed/pruned. The pruning process is discussed herein above in relation to FIG. 5.

Referring back to FIG. 7, the flow continues to reference 714, where a path is selected from the vertex of the representation of the source network element to the vertex of the representation of the destination network element in the graph to identify a route through the plurality of network functions of the network function chain. Each edge of the path is selected based on at least its cost measure. The selection may be additionally based on other factors, such as capacity measure, administrative policy, and/or a client's requirement. In one embodiment, the selection is to find the edge with the lowest cost measure from one vertex to another vertex in each segment of the graph. Taking FIG. 5 as an example, the operations may include selecting the lowest cost path (1) from the representation of the source 152 to subgraph 202; (2) from the first to the second split vertexes in subgraph 202; (3) from subgraph 202 to subgraph 204, considering all the directed edges in the representations of the network; (4) from the first to the second split vertexes in subgraph 204; (5) from subgraph 204 to subgraph 206, considering all the directed edges in the representations of the network; (6) from the first to the second split vertexes in subgraph 206; and (7) from subgraph 206 to the representation of the destination 154. In an alternative embodiment, the selection is to find the globally lowest cost path from the representation of the source 152 to the representation of the destination 154, which may involve a suboptimal selection (i.e., a selected path that is not the local lowest cost path) in one or more segments of the path, but results in the overall (i.e., global) lowest cost path from end-to-end.

The path selection is implemented through finding the K-shortest paths in one embodiment, where the K-shortest paths are selected. The method verifies the K-shortest paths in ascending order of cost measure to assure that the capacity limit of a given edge is not violated. Once the lowest cost path is selected, the traffic flow may be routed following the lowest cost path through the network. It is to be noted that the cost measure, capacity measure, and administrative policy and other state of the network may be updated, and a new lowest cost path may be selected after the updated state.

Operations of Base+Mode

The base mode aims at offering an optimum solution for the lowest cost path selection for a network function chain. With representations of the involved network being plugged (e.g., inserted/added) into the graph for the path selection calculation, the base mode is a solution particularly suitable when the size of the involved network is relatively small in consideration of the computation power of the PCE (e.g., a network with tens or hundreds of nodes). The more powerful the PCE is, the bigger the involved network can be before the search for the optimum solution becomes intractable for the PCE to perform the operations of the base mode. However, when the network is big (e.g., a network with thousands of nodes) and/or the PCE is not powerful enough, it may be infeasible to run the path selection calculation with the representations of the involved network being plugged into the graph. In that case, it may be desirable to use the base+mode for the path selection.

Figure 8:
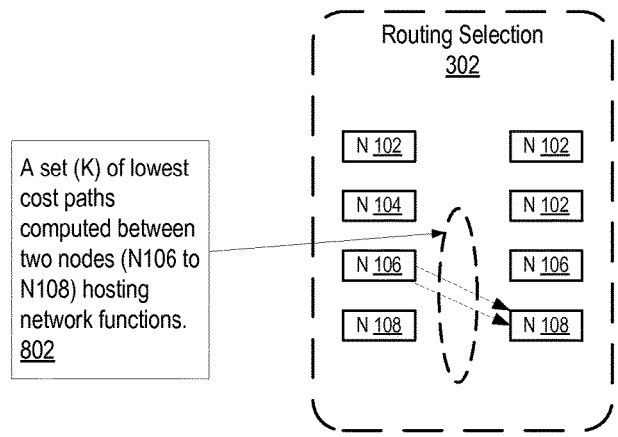
FIG. 8 illustrates the routing options from one node to another according to another embodiment of the invention.

FIG. 8 illustrates the routing options from one node to another according to another embodiment of the invention. Similar to FIG. 4, FIG. 8 illustrates options of routing selection 302. Instead of plugging into the graph the representation of network 100 from node 106 to node 108, the base+mode calculates a set of lowest cost paths (K paths) from node 106 to node 108 at reference 802. The calculation of the set of lowest cost paths is known in the art, once the cost measures of the edges is known (e.g., the Dijkstra's shortest path routing algorithm mentioned above may be utilized to calculate the set of lowest cost paths). Compared to calculating the various routes using the network representation 402 from node 106 to node 108 in network 100 (i.e., the calculation performed for the base mode), the calculation of the set of lowest cost paths is often less computation intensive when network 100 is big (e.g., instead of the four nodes for illustrative purpose, network 100 may contain 400 nodes, for example). The calculation of the set of lowest cost paths may be performed from any pair of nodes from the set of nodes 102-108.

Figure 9:
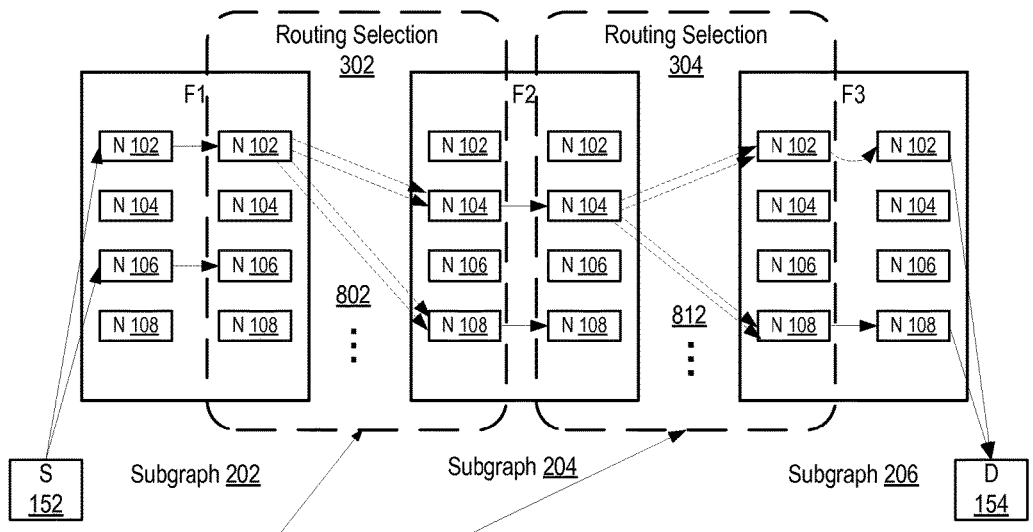
FIG. 9 illustrates a path selection from a source to a destination for a network function chain according to one embodiment of the invention.

The calculation of the set of lowest cost paths may be performed for routing selection 304 in the same manner as that for routing selection 302. After the calculations are done, the base+mode may make the path selection decision. FIG. 9 illustrates a path selection from a source to a destination for a network function chain according to one embodiment of the invention. FIG. 9 is similar to the corresponding FIG. 5 of the base mode and the common entities are not discussed here. One difference of FIG. 9 from FIG. 5 is within the routing selections 302 and 304, where the sets of lowest cost paths are illustrated as they have been computed in the manner discussed in relation to FIG. 8. While the routing selections are different in the base+mode, the path selection is similar to that of the base mode. For example, the prune process, and the process of dealing with ordering (e.g., loosed-ordered and not-ordered) are similar to the ones for the base mode, and the discussion can be referred to the ones in relation to FIGS. 5 and 6.

One benefit of calculating a set of lowest cost paths where the set is bigger than one (K<1) is that often the lowest cost may not be the only criteria in selecting the path from one node to another. For example, the lowest cost path from one node to the other may not satisfy the capacity required, or the lowest cost path may not be good for administrative reasons (i.e., thus, the lowest cost path would need to be removed/pruned as discussed herein above in relation to FIG. 5). If the lowest cost path is removed, the second lowest cost path can be selected when K shortest paths have been calculated. The process may continue until the lowest cost path that satisfies the given constraints is found. Thus, calculating K shortest paths from one node to the other increases the chance that a suitable lowest cost path that satisfies various constraints of routing a network function chain may be identified in a segment of the graph, and increases the overall chance of finding the lowest cost path for the network function chain.

Figure 10:
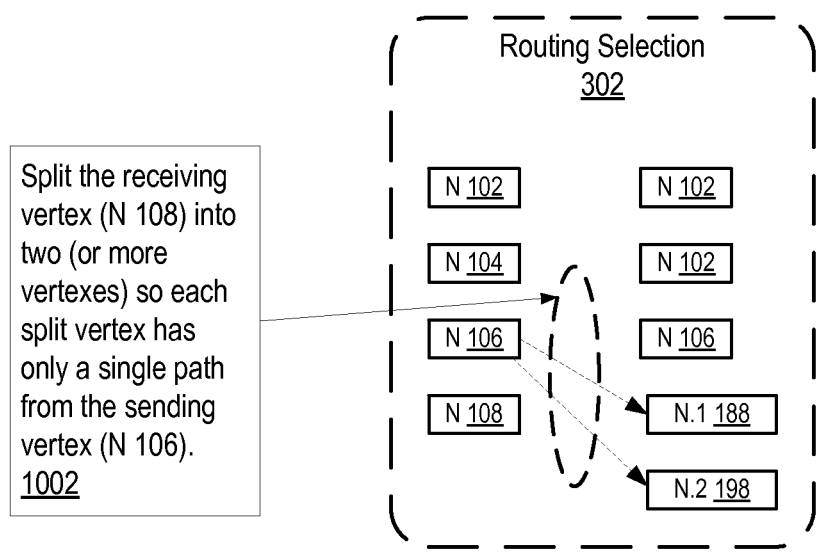
FIG. 10 illustrates a process to remove a multipath in routing selection according to one embodiment of the invention.

In some cases, after the removal/pruning of unsuitable lowest cost paths in the formed graph, a multipath remains from one vertex of one subgraph to another vertex of the next-ordered subgraph. For example, for a graph formed by a calculation of K=3 lowest cost paths, after the removal of the lowest cost path from one node to another, the second and the third lowest cost paths remain from the one node to the other. The calculation of multipath adds complexity to the graph-based base+mode approach. FIG. 10 illustrates a process to remove a multipath in routing selection according to one embodiment of the invention. In the figure, there are two lowest cost paths from node 106 to node 108 after the K shortest path calculation (and the lowest cost paths may also undergo a prune process removing paths not satisfying constraints for routing the associated network function chain). In order to differentiate the two paths, the vertex receiving the directed edge (i.e., the vertex in the next later-ordered subgraph) is duplicated/split and each duplicated/split vertex connects to one path (i.e., a unique path) of the multipath. The duplicated/split vertexes of the representation of node 108 are denoted as node.1 and node.2 at references 188 and 198 respectively. As indicated in reference 1002, the vertex receiving the edge of the multipath is split into two (or more vertexes when more than two paths exists to the vertex from the same vertex in the earlier-ordered subgraph), so that each split vertex in the next later-ordered subgraph is associated with only a single path (e.g., represented by a connection in the graph and associated with a single edge) from the sending vertex in the earlier-ordered subgraph. Each multipath occurrence in the overall graph may be removed through this process of splitting the receiving vertexes. After the split, each of the directed edges represents a single lowest cost path. Accordingly, the path selection from the source to the destination may be performed in the manner as described in relation to FIG. 9.

Flow Diagram for the Base+Mode

Figure 11:
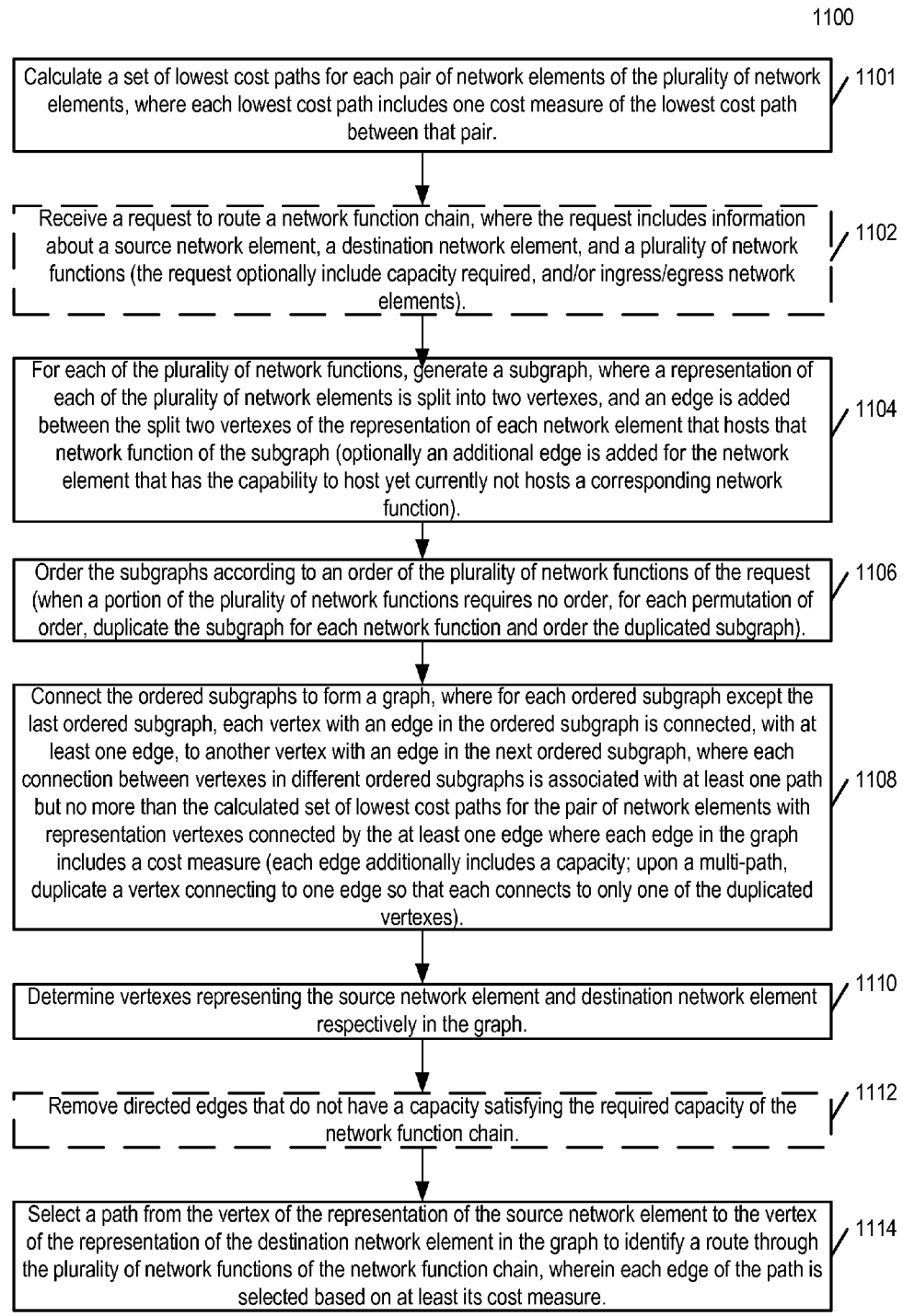
FIG. 11 is a flow diagram illustrating the operations of the base+mode according to one embodiment of the invention.

FIG. 11 is a flow diagram illustrating the operations of the base+mode according to one embodiment of the invention. Method 1100 may be implemented in an electronic device similar to the ones discussed in relation to FIG. 7. Method 700 and 1100 are similar, and embodiments applicable to the former generally apply to the latter, too. The operations in references 702-706 and 710-714 perform the same or similar operations in references 1102-1106 and 1110-1114.

One difference of FIG. 11 from FIG. 7 is that method 1100 includes reference 1101, where a set of lowest cost paths for each pair of network elements of the plurality of network elements of a network is calculated. The calculation may be performed prior to receiving any request of routing a network function chain. Each lowest cost path includes a cost measure of the lowest cost path between that pair of network elements. The calculation includes the lowest cost path from a first network element to a second network element, and also the lowest cost path from the second network element to the first network element, and the costs of these co-routed paths in the exact opposite directions are often the same.

Another difference of FIG. 11 from FIG. 7 is that operations in reference 1108 are different from the ones in reference 708. At reference 1108, the ordered subgraphs are connected to form a graph where, for each ordered subgraph except the last ordered subgraph, each vertex with a directed edge in the ordered subgraph is connected, with at least one edge, to another vertex with a directed edge in the next ordered subgraph. Importantly, each connection between vertexes in different ordered subgraphs is associated with at least one path but no more than the calculated set of lowest cost paths for the pair of network elements with representation vertexes connected by the at least one edge. In the example above where K=3, each connection will not be associated with more than three lowest cost paths between any two vertexes connecting two different ordered subgraphs. Some connections may be associated with less than three lowest cost paths at the start when the two network elements do not have three paths connecting them. In other cases, due to routing constraints (e.g., capacity limitation and administrative reasons), less than three lowest cost paths remain after the pruning When there is more than one lowest cost path associated with a connection from one vertex of an earlier-ordered subgraph to another vertex in the subsequent (i.e., next later-ordered) subgraph, which causes multipath, the receiving vertex connecting to a directed edge in the subsequent subgraph is split so that each directed edge to the receiving vertex connects to only one of the split vertexes, as discussed in relation to FIG. 10.

It is to be noted that the base mode is more suitable for a smaller and less dense network in routing a network function chain, while the base+mode is more suitable for a bigger and more complicated network. However, the suitability is relative to the computing power of the PCE and objective of the routing. When the PCE is sufficiently powerful in computation and/or the objective of the routing is to find the best route possible, the base mode may be utilized in the bigger and more complicated network. In contrast, when the PCE is less powerful and/or the objective of the routing is to quickly find a near optimum solution, the base+mode may be utilized in the smaller and less dense network.

It is to be noted that either the base mode or the base+ mode may not find a feasible solution. This may be due to the fact that there is no route existing in the network for the given network function chain, or such a route exists in the network, but the route fails to satisfy the capacity requirement of the network function chain. In either case, the implemented method (in the base or base+mode) can notify a management interface, indicating that an error is returned and the type of the error (e.g., no route exists, a route exists but does not satisfies the capacity request). Thus, for a given request to route a network function chain, either a path is selected or a failure may be returned (with the reason of the failure indicated).

There are many advantages of the graph-based approach in the embodiments of the invention. These embodiments are easy to implement in a real product, as the embodiments are efficient in finding the lowest cost paths for a given network function chain. These embodiments are also suitable for the scenario where path selection is needed for real-time arrivals of network function chain requests. In addition, these embodiments can be applied to legacy network functions, vNFs of NFV, and a hybrid of legacy network functions and vNFs. Furthermore, these embodiments are agnostic to the network function forwarding technologies deployed for forwarding a network function chain, and they are also agnostic to the algorithm to select the lowest cost path between two vertexes. In addition, cost measures, capacity, and administrative reasons can be adjusted for different network settings, and with these changed parameters, these embodiments can be utilized (e.g., dynamically) in different cost models, link conditions, and/or network infrastructure types.

Electronic Devices Implementing Embodiments of the Invention

Figure 12:
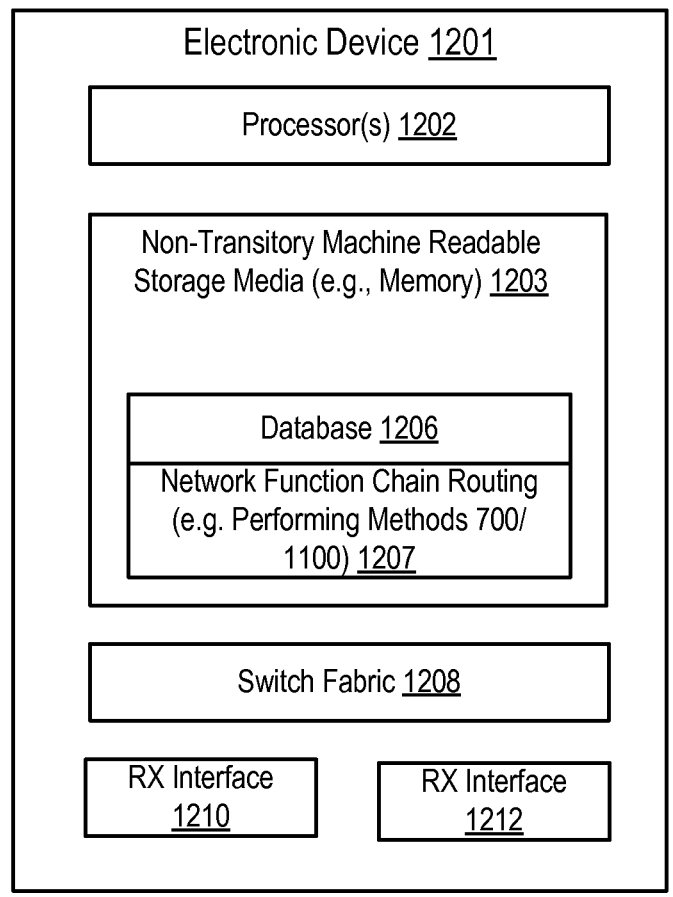
FIG. 12 illustrates an electronic device containing a network function chain routing module according to one embodiment of the invention.

FIG. 12 illustrates an electronic device containing a network function chain routing module according to one embodiment of the invention. Electronic device 1201 may be a part of nodes 102-108 in FIG. 1 in one embodiment. In an alternative embodiment, electronic device 1201 may be a separate node containing the network function chain routing module 1207, which is often implemented as a part of a path computation element (PCE). Network device 1201 contains processor or processors 1202. It also contains non-transitory machine readable storage media 1203, which contains database 1206 to store the results of the graph generation and path selection as discussed in relation to methods 700 and 1100. Network function chain routing module 1207 is stored in the non-transitory machine readable storage media 1203, too. Network function chain routing module 1207 may be instantiated by processor 1202 and perform network function chain routing such as methods 700 and/or 1100 as discussed herein above. Electronic device 1201 may also contains switch fabric 508 to switch data between transmitting/receiving interfaces 1210/1212 when computing the network function chain routing.

SDN and NFV Environment Utilizing Embodiment of the Invention

Embodiments of the invention may be utilized in a SDN and NFV network containing network devices. FIG. 13A illustrates connectivity between network devices (NDs) within an exemplary network, as well as three exemplary implementations of the NDs, according to some embodiments of the invention. FIG. 13A shows NDs 1300A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 1300A, E, and F illustrates that these NDs act as ingress and egress points for the network (and thus, these NDs are sometimes referred to as edge NDs; while the other NDs may be called core NDs).

Two of the exemplary ND implementations in FIG. 13A are: 1) a special-purpose network device 1302 that uses custom application—specific integrated—circuits (ASICs) and a proprietary operating system (OS); and 2) a general purpose network device 1304 that uses common off-the-shelf (COTS) processors and a standard OS.

The special-purpose network device 1302 includes networking hardware 1310 comprising compute resource(s) 1312 (which typically include a set of one or more processors), forwarding resource(s) 1314 (which typically include one or more ASICs and/or network processors), and physical network interfaces (NIs) 1316 (sometimes called physical ports), as well as non-transitory machine readable storage media 1318 having stored therein networking software 1320. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 1300A-H. During operation, the networking software 1320 may be executed by the networking hardware 1310 to instantiate a set of one or more networking software instance(s) 1322. Each of the networking software instance(s) 1322, and that part of the networking hardware 1310 that executes that network software instance (be it hardware dedicated to that networking software instance and/or time slices of hardware temporally shared by that networking software instance with others of the networking software instance(s) 1322), form a separate virtual network element 1330A-R. Each of the virtual network element(s) (VNEs) 1330A-R includes a control communication and configuration module 1332A-R (sometimes referred to as a local control module or control communication module) and forwarding table(s) 1334A-R, such that a given virtual network element (e.g., 1330A) includes the control communication and configuration module (e.g., 1332A), a set of one or more forwarding table(s) (e.g., 1334A), and that portion of the networking hardware 1310 that executes the virtual network element (e.g., 1330A).

The special-purpose network device 1302 is often physically and/or logically considered to include: 1) a ND control plane 1324 (sometimes referred to as a control plane) comprising the compute resource(s) 1312 that execute the control communication and configuration module(s) 1332A-R; and 2) a ND forwarding plane 1326 (sometimes referred to as a forwarding plane, a data plane, or a media plane) comprising the forwarding resource(s) 1314 that utilize the forwarding table(s) 1334A-R and the physical NIs 1316. By way of example, where the ND is a router (or is implementing routing functionality), the ND control plane 1324 (the compute resource(s) 1312 executing the control communication and configuration module(s) 1332A-R) is typically responsible for participating in controlling how data (e.g., packets) is to be routed (e.g., the next hop for the data and the outgoing physical NI for that data) and storing that routing information in the forwarding table(s) 1334A-R, and the ND forwarding plane 1326 is responsible for receiving that data on the physical NIs 1316 and forwarding that data out the appropriate ones of the physical NIs 1316 based on the forwarding table(s) 1334A-R.

FIG. 13B illustrates an exemplary way to implement the special-purpose network device 1302 according to some embodiments of the invention. FIG. 13B shows a special-purpose network device including cards 1338 (typically hot pluggable). While in some embodiments the cards 1338 are of two types (one or more that operate as the ND forwarding plane 1326 (sometimes called line cards), and one or more that operate to implement the ND control plane 1324 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1336 (e.g., a first full mesh coupling the line cards and a second full mesh coupling all of the cards).

Returning to FIG. 13A, the general purpose network device 1304 includes hardware 1340 comprising a set of one or more processor(s) 1342 (which are often COTS processors) and network interface controller(s) 1344 (NICs; also known as network interface cards) (which include physical NIs 1346), as well as non-transitory machine readable storage media 1348 having stored therein software 1350. During operation, the processor(s) 1342 execute the software 1350 to instantiate one or more sets of one or more applications 1364A-R. While one embodiment does not implement virtualization, alternative embodiments may use different forms of virtualization—represented by a virtualization layer 1354 and software containers 1362A-R. For example, one such alternative embodiment implements operating system-level virtualization, in which case the virtualization layer 1354 represents the kernel of an operating system (or a shim executing on a base operating system) that allows for the creation of multiple software containers 1362A-R that may each be used to execute one of the sets of applications 1364A-R. In this embodiment, the multiple software containers 1362A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 1354 represents a hypervisor (sometimes referred to as a virtual machine monitor (VMM)) or a hypervisor executing on top of a host operating system; and 2) the software containers 1362A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 1364A-R, as well as the virtualization layer

1354 and software containers 1362A-R if implemented, are collectively referred to as software instance(s) 1352. Each set of applications 1364A-R, corresponding software container 1362A-R if implemented, and that part of the hardware 1340 that executes them (be it hardware dedicated to that execution and/or time slices of hardware temporally shared by software containers 1362A-R), forms a separate virtual network element(s) 1360A-R.

The virtual network element(s) 1360A-R perform similar functionality to the virtual network element(s) 1330A-R— e.g., similar to the control communication and configuration module(s) 1332A and forwarding table(s) 1334A (this virtualization of the hardware 1340 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 1362A-R differently. For example, while embodiments of the invention are illustrated with each software container 1362A-R corresponding to one VNE 1360A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 1362A-R to VNEs also apply to embodiments where such a finer level of granularity is used.

In certain embodiments, the virtualization layer 1354 includes a virtual switch that provides similar forwarding services as a physical Ethernet switch. Specifically, this virtual switch forwards traffic between software containers 1362A-R and the NIC(s) 1344, as well as optionally between the software containers 1362A-R; in addition, this virtual switch may enforce network isolation between the VNEs 1360A-R that by policy are not permitted to communicate with each other (e.g., by honoring virtual local area networks (VLANs)).

The third exemplary ND implementation in FIG. 13A is a hybrid network device 1306, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 1302) could provide for para-virtualization to the networking hardware present in the hybrid network device 1306.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1330A-R, VNEs 1360A-R, and those in the hybrid network device 1306) receives data on the physical NIs (e.g., 1316, 1346) and forwards that data out the appropriate ones of the physical NIs (e.g., 1316, 1346). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 13C:
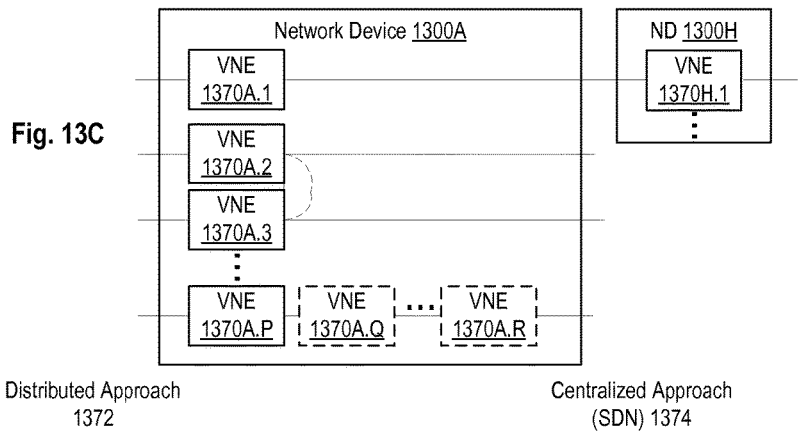
FIG. 13C illustrates various exemplary ways in which virtual network elements (VNEs) may be coupled according to some embodiments of the invention.

FIG. 13C illustrates various exemplary ways in which VNEs may be coupled according to some embodiments of the invention. FIG. 13C shows VNEs 1370A.1-1370A.P (and optionally VNEs 1370A.Q-1370A.R) implemented in ND 1300A and VNE 1370H.1 in ND 1300H. In FIG. 13C, VNEs 1370A.1-P are separate from each other in the sense that they can receive packets from outside ND 1300A and forward packets outside of ND 1300A; VNE 1370A.1 is coupled with VNE 1370H.1, and thus they communicate packets between their respective NDs; VNE 1370A.2-1370A.3 may optionally forward packets between themselves without forwarding them outside of the ND 1300A; and VNE 1370A.P may optionally be the first in a chain of VNEs that includes VNE 1370A.Q followed by VNE 1370A.R (this is sometimes referred to as dynamic service/function chaining, where each of the VNEs in the series of VNEs provides a different service/function—e.g., one or more layer 4-7 network services/functions). While FIG. 13C illustrates various exemplary relationships between the VNEs, alternative embodiments may support other relationships (e.g., more/fewer VNEs, more/fewer dynamic service/function chains, multiple different dynamic service/function chains with some common VNEs and some different VNEs).

The NDs of FIG. 13A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 13A may also host one or more such servers (e.g., in the case of the general purpose network device 1304, one or more of the software containers 1362A-R may operate as servers; the same would be true for the hybrid network device 1306; in the case of the special-purpose network device 1302, one or more such servers could also be run on a virtualization layer executed by the compute resource(s) 1312); in which case the servers are said to be co-located with the VNEs of that ND.

A virtual network is a logical abstraction of a physical network (such as that in FIG. 13A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 13D:
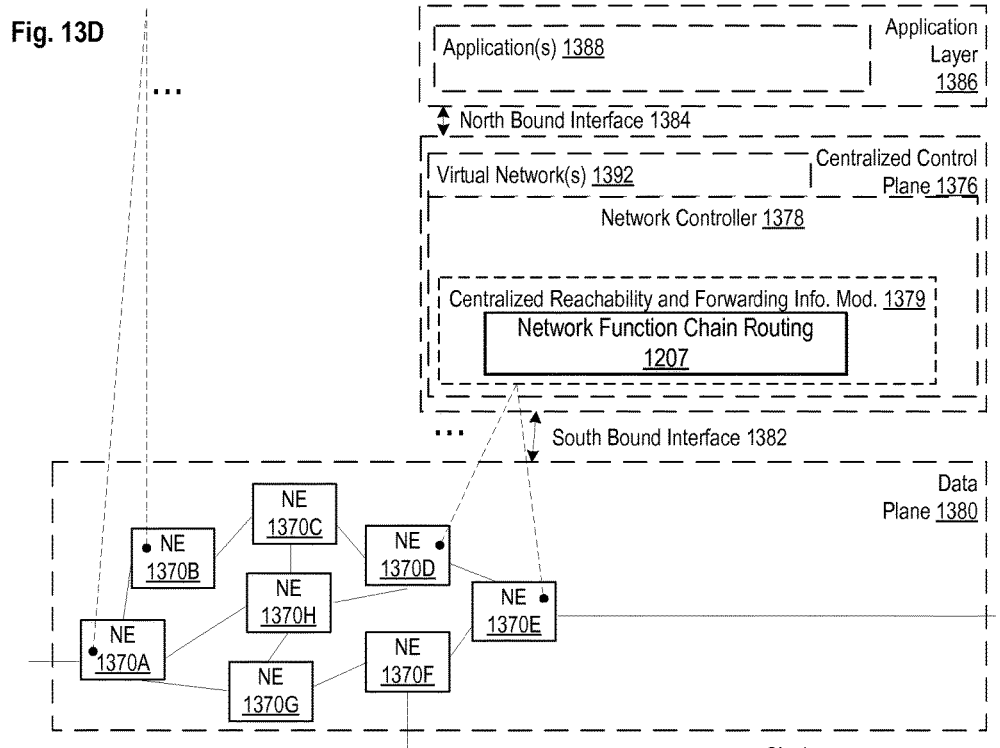
FIG. 13D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 13D illustrates a network with a single network element on each of the NDs of FIG. 13A, and within this straight forward approach contrasts a traditional distributed approach (commonly used by traditional routers) with a centralized approach for maintaining reachability and forwarding information (also called network control), according to some embodiments of the invention. Specifically, FIG. 13D illustrates network elements (NEs) 1370A-H with the same connectivity as the NDs 1300A-H of FIG. 13A.

FIG. 13D illustrates that the distributed approach 1372 distributes responsibility for generating the reachability and forwarding information across the NEs 1370A-H; in other words, the process of neighbor discovery and topology discovery is distributed.

For example, where the special-purpose network device 1302 is used, the control communication and configuration module(s) 1332A-R of the ND control plane 1324 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 1370A-H (e.g., the compute resource(s) 1312 executing the control communication and configuration module(s) 1332A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1324. The ND control plane 1324 programs the ND forwarding plane 1326 with information (e.g., adjacency and route information) based on the routing structure(s). For example, the ND control plane 1324 programs the adjacency and route information into one or more forwarding table(s) 1334A-R (e.g., Forwarding Information Base (FIB), Label Forwarding Information Base (LFIB), and one or more adjacency structures) on the ND forwarding plane 1326. For layer 2 forwarding, the ND can store one or more bridging tables that are used to forward data based on the layer 2 information in that data. While the above example uses the special-purpose network device 1302, the same distributed approach 1372 can be implemented on the general purpose network device 1304 and the hybrid network device 1306.

FIG. 13D illustrates that a centralized approach 1374 (also known as software defined networking (SDN)) that decouples the system that makes decisions about where traffic is sent from the underlying systems that forwards traffic to the selected destination. The illustrated centralized approach 1374 has the responsibility for the generation of reachability and forwarding information in a centralized control plane 1376 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1376 has a south bound interface 1382 with a data plane 1380 (sometime referred to the infrastructure layer, network forwarding plane, or forwarding plane (which should not be confused with a ND forwarding plane)) that includes the NEs 1370A-H (sometimes referred to as switches, forwarding elements, data plane elements, or nodes). The centralized control plane 1376 includes a network controller 1378, which includes a centralized reachability and forwarding information module 1379 that determines the reachability within the network and distributes the forwarding information to the NEs 1370A-H of the data plane 1380 over the south bound interface 1382 (which may use the OpenFlow protocol). Thus, the network intelligence is centralized in the centralized control plane 1376 executing on electronic devices that are typically separate from the NDs. In one embodiment, centralized reachability and forwarding information module 1379 includes network function chain routing module 1207 for routing network function chains. In that case, network controller 1378 performs the function of a PCE.

For example, where the special-purpose network device 1302 is used in the data plane 1380, each of the control communication and configuration module(s) 1332A-R of the ND control plane 1324 typically include a control agent that provides the VNE side of the south bound interface 1382. In this case, the ND control plane 1324 (the compute resource(s) 1312 executing the control communication and configuration module(s) 1332A-R) performs its responsibility for participating in controlling how data (e.g., packets) is to be routed (e.g., the next hop for the data and the outgoing physical NI for that data) through the control agent communicating with the centralized control plane 1376 to receive the forwarding information (and in some cases, the reachability information) from the centralized reachability and forwarding information module 1379 (it should be understood that in some embodiments of the invention, the control communication and configuration module(s) 1332A-R, in addition to communicating with the centralized control plane 1376, may also play some role in determining reachability and/or calculating forwarding information—albeit less so than in the case of a distributed approach; such embodiments are generally considered to fall under the centralized approach 1374, but may also be considered a hybrid approach).

While the above example uses the special-purpose network device 1302, the same centralized approach 1374 can be implemented with the general purpose network device 1304 (e.g., each of the VNE 1360A-R performs its responsibility for controlling how data (e.g., packets) is to be routed (e.g., the next hop for the data and the outgoing physical NI for that data) by communicating with the centralized control plane 1376 to receive the forwarding information (and in some cases, the reachability information) from the centralized reachability and forwarding information module 1379; it should be understood that in some embodiments of the invention, the VNEs 1360A-R, in addition to communicating with the centralized control plane 1376, may also play some role in determining reachability and/or calculating forwarding information—albeit less so than in the case of a distributed approach) and the hybrid network device 1306. In fact, the use of SDN techniques can enhance the NFV techniques typically used in the general purpose network device 1304 or hybrid network device 1306 implementations as NFV is able to support SDN by providing an infrastructure upon which the SDN software can be run, and NFV and SDN both aim to make use of commodity server hardware and physical switches.

FIG. 13D also shows that the centralized control plane 1376 has a north bound interface 1384 to an application layer 1386, in which resides application(s) 1388. The centralized control plane 1376 has the ability to form virtual networks 1392 (sometimes referred to as a logical forwarding plane, network services, or overlay networks (with the NEs 1370A-H of the data plane 1380 being the underlay network)) for the application(s) 1388. Thus, the centralized control plane 1376 maintains a global view of all NDs and configured NEs/VNEs, and it maps the virtual networks to the underlying NDs efficiently (including maintaining these mappings as the physical network changes either through hardware (ND, link, or ND component) failure, addition, or removal). The NEs 1370A-H are implementations of the plurality of the network elements discussed in relation to FIGS. 7 and 11 in one embodiment.

While FIG. 13D shows the distributed approach 1372 separate from the centralized approach 1374, the effort of network control may be distributed differently or the two combined in certain embodiments of the invention. For example: 1) embodiments may generally use the centralized approach (SDN) 1374, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1374, but may also be considered a hybrid approach.

While FIG. 13D illustrates the simple case where each of the NDs 1300A-H implements a single NE 1370A-H, it should be understood that the network control approaches described with reference to FIG. 13D also work for networks where one or more of the NDs 1300A-H implement multiple VNEs (e.g., VNEs 1330A-R, VNEs 1360A-R, those in the hybrid network device 1306). Alternatively or in addition, the network controller 1378 may also emulate the implementation of multiple VNEs in a single ND. Specifically, instead of (or in addition to) implementing multiple VNEs in a single ND, the network controller 1378 may present the implementation of a VNE/NE in a single ND as multiple VNEs in the virtual networks 1392 (all in the same one of the virtual network(s) 1392, each in different ones of the virtual network(s) 1392, or some combination). For example, the network controller 1378 may cause an ND to implement a single VNE (a NE) in the underlay network, and then logically divide up the resources of that NE within the centralized control plane 1376 to present different VNEs in the virtual network(s) 1392 (where these different VNEs in the overlay networks are sharing the resources of the single VNE/NE implementation on the ND in the underlay network).

Figure 13E:
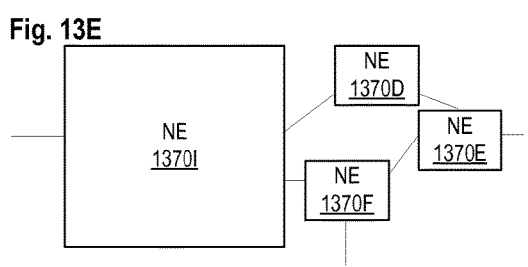
FIG. 13E illustrates the simple case of where each of the NDs implements a single NE, but a centralized control plane has abstracted multiple of the NEs in different NDs into (to represent) a single NE in one of the virtual network(s), according to some embodiments of the invention.
Figure 13F:
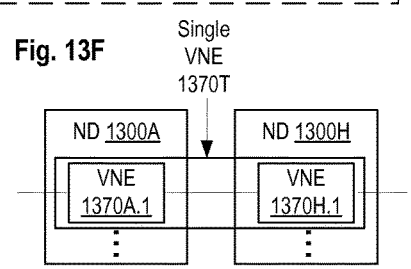
FIG. 13F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 13E and 13F respectively illustrate exemplary abstractions of NEs and VNEs that the network controller 1378 may present as part of different ones of the virtual networks 1392. FIG. 13E illustrates the simple case of where each of the NDs 1300A-H implements a single NE 1370A-H (see FIG. 13D), but the centralized control plane 1376 has abstracted multiple of the NEs in different NDs (the NEs 1370A-C and G-H) into (to represent) a single NE 13701 in one of the virtual network(s) 1392 of FIG. 13D, according to some embodiments of the invention. FIG. 13E shows that in this virtual network, the NE 13701 is coupled to NE 1370D and 1370F, which are both still coupled to NE 1370E.

FIG. 13F illustrates a case where multiple VNEs (VNE 1370A.1 and VNE 1370H.1) are implemented on different NDs (ND 1300A and ND 1300H) and are coupled to each other, and where the centralized control plane 1376 has abstracted these multiple VNEs such that they appear as a single VNE 1370T within one of the virtual networks 1392 of FIG. 13D, according to some embodiments of the invention. Thus, the abstraction of a NE or VNE can span multiple NDs.

While some embodiments of the invention implement the centralized control plane 1376 as a single entity (e.g., a single instance of software running on a single electronic device), alternative embodiments may spread the functionality across multiple entities for redundancy and/or scalability purposes (e.g., multiple instances of software running on different electronic devices).

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in an electronic device coupled to a network including a plurality of network elements, wherein traffic flows of the network pass through network function chains, wherein each network function is associated with at least one network element, the method comprising:
   for each of a plurality of network functions of a network function chain, generating a subgraph, wherein a representation of each of the plurality of network elements is split into two vertexes, and an edge is added between the split two vertexes of the representation of each network element that hosts that network function of the subgraph;
   ordering the subgraphs according to an order of the plurality of network functions of the network function chain;
   connecting the ordered subgraphs to form a graph, wherein for each ordered subgraph except the last ordered subgraph, each vertex with an edge in the ordered subgraph being connected with an edge to another vertex with an edge in the next ordered subgraph, each connection including all paths of the network between a pair of network elements represented by the vertexes connected with the edge, and wherein each edge in the graph includes a cost measure;

determining vertexes of a representation of a source network element and a representation of a destination network element in the graph; and selecting a path from the vertex of the representation of the source network element to the vertex of the representation of the destination network element in the graph to identify a route through the plurality of network functions of the network function chain, wherein each edge of the path is selected based on at least its cost measure.

2. The method of claim 1, further comprising:

receiving a request to route the network function chain, wherein the request includes information about the source network element, the destination network element, the plurality of network functions, and information about required capacity of the network function chain, wherein each edge between vertexes of representations of different network elements includes a capacity measure that is associated with the capacity between the different network elements, and wherein at least one edge of the path is selected based additionally on its capacity measure.

3. The method of claim 2, further comprising:

prior to selecting the path, removing edges in the graph that do not have a capacity measure satisfying the required capacity of the network function chain.

4. The method of claim 2, wherein selecting the path comprises selecting a path for each connection between vertexes in different ordered subgraphs from a set of lowest cost alternative paths and finding the lowest cost alternative path that satisfies the required capacity of the network function chain.

5. The method of claim 1, wherein a first portion of the plurality of network functions does not require an order for the network functions in the first portion, and a second portion of the plurality of network functions requires an order for the network functions in the second portion, and wherein ordering the subgraphs according to the order of the plurality of network functions further comprises, for each order permutation of the first portion of the plurality of network functions, duplicating the generated subgraph for each network function in the first portion, and for the second portion of the plurality of network functions, ordering the generated subgraphs in that order of the second portion.

6. The method of claim 1, wherein at least one additional edge is added in one subgraph between the split two vertexes of the representation of a network element that does not currently host that network function of the subgraph but that has the capability to host that network function of the subgraph, and wherein the at least one additional edge includes a cost measure that is different from the cost measure of an edge between the split two vertexes of the representation of a network element that currently hosts that network function of the subgraph.

7. The method of claim 1, wherein the cost measure of at least one edge of the graph is calculated based at least on one of the following:

a hop count between the different network elements with representation vertexes connected by the edge;

a time delay between the different network elements with representation vertexes connected by the edge;

a distance measure between the different network elements with representation vertexes connected by the edge;

a capacity measure; and an administrative cost.

8. The method of claim 1, wherein each network function of the plurality of network functions is implemented through network function virtualization (NFV).

9. A method implemented in an electronic device coupled to a network including a plurality of network elements, wherein traffic flows of the network pass through network function chains, wherein each network function is associated with at least one network element, the method comprising:

calculating a set of lowest cost paths for each pair of network elements of the plurality of network elements, wherein each lowest cost path includes a cost measure;

for each of a plurality of network functions of a network function chain, generating a subgraph, wherein a representation of each of the plurality of network elements is split into two vertexes, and an edge is added between the split two vertexes of the representation of each network element that hosts that network function of the subgraph;

ordering the subgraphs according to an order of the plurality of network functions of the network function chain;

connecting the ordered subgraphs to form a graph, wherein for each ordered subgraph except the last ordered subgraph, each vertex with an edge in the ordered subgraph is connected, with at least one edge, to another vertex with an edge in the next ordered subgraph, wherein each connection between vertexes in different ordered subgraphs is associated with at least one path but no more than the calculated set of lowest cost paths for the pair of network elements with representation vertexes connected by the at least one edge, and wherein each edge in the graph includes a cost measure;

determining vertexes of a representation of a source network element and a representation of a destination network element in the graph; and selecting a path from the vertex of the representation of the source network element to the vertex of the representation of the destination network element in the graph to identify a route through the plurality of network functions of the network function chain, wherein each edge of the path is selected based on at least its cost measure.

10. The method of claim 9, wherein when the connection between vertexes in different ordered subgraphs is associated with more than one lowest cost path, the vertex with the edge in the next later-ordered subgraph is split so that the connection between the vertexes includes an edge for each of the associated calculated set of lowest cost paths, and each of these edges connects the vertex with an edge in the earlier-ordered subgraph to a unique split vertex of the next later-ordered subgraph.

11. The method of claim 9, further comprising:

receiving a request to route the network function chain, wherein the request includes information about the source network element, the destination network element, the plurality of network functions, and information about required capacity of the network function chain, wherein each edge between vertexes of representations of different network elements includes a capacity measure that is associated with the capacity between the different network elements, and wherein at least one edge of the path is selected based additionally on its capacity measure.

12. The method of claim 11, further comprising:

prior to selecting the path, removing edges in the graph that do not have a capacity measure satisfying the required capacity of the network function chain.

13. The method of claim 11, wherein selecting the path comprises selecting a path for each connection between vertexes in different ordered subgraphs from the set of lowest cost paths for the pair of network elements with representation vertexes connected by the at least one edge, and wherein the selected path for the connection is the lowest cost path that satisfies the required capacity of the network function chain.

14. The method of claim 9, wherein a first portion of the plurality of network functions does not require an order for the network functions in the first portion, and a second portion of the plurality of network functions requires an order for the network functions in the second portion, and wherein ordering the subgraphs according to the order of the plurality of network functions further comprises, for each order permutation of the first portion of the plurality of network functions, duplicating the generated subgraph for each network function in the first portion, and for the second portion of the plurality of network functions, ordering the generated subgraphs in that order of the second portion.

15. The method of claim 9, wherein at least one additional edge is added in one subgraph between the split two vertexes of the representation of a network element that does not currently host that network function of the subgraph but that has the capability to host that network function of the subgraph, and wherein the at least one additional edge includes a cost measure that is higher than the cost measure of an edge between the split two vertexes of the representation of a network element that currently hosts that network function of the subgraph.

16. The method of claim 9, wherein each network function of the plurality of network functions is implemented through network function virtualization (NFV).

17. A non-transitory machine-readable medium having instructions stored therein, which when executed by a processor, cause the processor to perform operations in an electronic device coupled to a network including a plurality of network elements, wherein traffic flows of the network pass through network function chains, wherein each network function is associated with at least one network element, the operations comprising:

for each of a plurality of network functions of a network function chain, generating a subgraph, wherein a representation of each of the plurality of network elements is split into two vertexes, and an edge is added between the split two vertexes of the representation of each network element that hosts that network function of the subgraph;

ordering the subgraphs according to an order of the plurality of network functions of the network function chain;

connecting the ordered subgraphs to form a graph, wherein for each ordered subgraph except the last ordered subgraph, each vertex with an edge in the ordered subgraph being connected with an edge to another vertex with an edge in the next ordered subgraph, each connection including all paths of the network between a pair of network elements represented by the vertexes connected with the edge, and wherein each edge in the graph includes a cost measure;

determining vertexes of the representation of a source network element and a representation of a destination network element in the graph; and selecting a path from the vertex of the representation of the source network element to the vertex of the representation of the destination network element in the graph to identify a route through the plurality of network functions of the network function chain, wherein each edge of the path is selected based on at least its cost measure.

18. The non-transitory machine-readable medium of claim 17, wherein a first portion of the plurality of network functions does not require an order for the network functions in the first portion, and at least one second portion of the plurality of network functions requires an order for the network functions in the at least one second portion, and wherein ordering the subgraphs according to the order of the plurality of network functions further comprises, for each order permutation of the first portion of the plurality of network functions, duplicating the generated subgraph for each network function in the first portion, and for each order of the at least one second portion of the plurality of network functions, ordering the generated subgraphs in that order of the at least one second portion.

19. A non-transitory machine-readable medium having instructions stored therein, which when executed by a processor, cause the processor to perform operations in an electronic device coupled to a network including a plurality of network elements, wherein traffic flows of the network pass through network function chains, wherein each network function is associated with at least one network element, the operations comprising:

calculating a set of lowest cost paths for each pair of network elements of the plurality of network elements, wherein each lowest cost path includes a cost measure;

for each of a plurality of network functions of a network function chain, generating a subgraph, wherein a representation of each of the plurality of network elements is split into two vertexes, and an edge is added between the split two vertexes of the representation of each network element that hosts that network function of the subgraph;

ordering the subgraphs according to an order of the plurality of network functions of the network function chain;

connecting the ordered subgraphs to form a graph, wherein for each ordered subgraph except the last ordered subgraph, each vertex with an edge in the ordered subgraph is connected, with at least one edge, to another vertex with an edge in the next ordered subgraph, wherein each connection between vertexes in different ordered subgraphs is associated with at least one path but no more than the calculated set of lowest cost paths for the pair of network elements with representation vertexes connected by the at least one edge, and wherein each edge in the graph includes a cost measure;

determining vertexes of a representation of a source network element and a representation of a destination network element in the graph; and selecting a path from the vertex of the representation of the source network element to the vertex of the representation of the destination network element in the graph to identify a route through the plurality of network functions of the network function chain, wherein each edge of the path is selected based on at least its cost measure.

20. The non-transitory machine-readable medium of claim 19, wherein at least one additional edge is added in one subgraph between the split two vertexes of the representation of a network element that does not currently host that network function of the subgraph but that has the capability to host that network function of the subgraph, and wherein the at least one additional edge includes a cost measure that is different from the cost measure of an edge between the split two vertexes of the representation of a network element that currently hosts that network function of the subgraph.

\* \* \* \* \*